US006175871B1

(12) United States Patent
Schuster et al.

(10) Patent No.: US 6,175,871 B1
(45) Date of Patent: Jan. 16, 2001

(54) METHOD AND APPARATUS FOR REAL TIME COMMUNICATION OVER PACKET NETWORKS

(75) Inventors: Guido M. Schuster, DesPlaines; Ikhlaq S. Sidhu, Buffalo Grove, both of IL (US)

(73) Assignee: 3Com Corporation, Santa Clara, CA (US)

(*) Notice: Under 35 U.S.C. 154(b), the term of this patent shall be extended for 0 days.

(21) Appl. No.: 08/942,446

(22) Filed: Oct. 1, 1997

(51) Int. Cl.[7] ..................................................... G06F 13/00

(52) U.S. Cl. ............................ 709/231; 709/220; 370/252

(58) Field of Search .................................. 709/231, 220, 709/228; 370/252

(56) References Cited

U.S. PATENT DOCUMENTS

| | | | |
|---|---|---|---|
| 5,812,790 | * | 9/1998 | Randall ................................ 709/247 |
| 5,859,979 | * | 1/1999 | Tung et al. ........................... 709/228 |
| 5,931,928 | * | 8/1999 | Brennan et al. ........................ 710/68 |
| 5,949,975 | * | 9/1999 | Batty et al. ........................... 709/213 |
| 6,005,846 | * | 12/1999 | Best et al. ............................. 370/264 |
| 6,031,848 | * | 2/2000 | Brennan ................................ 370/522 |

FOREIGN PATENT DOCUMENTS

WO 95/22233    8/1995   (WO).
WO 96/15598    5/1996   (WO).

OTHER PUBLICATIONS

Bolot et al.; Adaptive Error Control for Packet Video in the Internet; Proc., Intern'l Conference on Image Processing, pp. 25–28, Sep. 1996.*

Kajijama et al.; Experiments of IP over ATM with Congestion Avoidance Flow Control: CEFLAR; GLOBECOM 96; pp. 484–489, Nov. 1996.*

Bolot et al.; A Rate Control Mechanism for Packet Video in the Internet; INFOCOM 94; pp. 1216–1223, Jun. 1994.*

Chakrabarti et al.; Adaptive Control for Packet Video; Proc. of the Intern'l Conference on Multimedia Computine and Systems, pp. 56–62, May 1994.*

Sadka et al.; Rate Control Feedback Mechanism for Packet Video Networks; Electronic Letters, vol. 32, No. 8; pp. 716–717, Apr. 1996.*

Podolsky et al., "Simulation of FEC–Based Error Control for Packet Audio on the Internet", IEEE Infocom '98, San Francisco, CA, pp. 1–12, Mar. 1998.

Bolot et al., "The Case for FEC–Based Error Control for Packet Audio in the Internet" pp. 1–12, to appear in *ACM MultimediaSystems*.

(List continued on next page.)

*Primary Examiner*—Kenneth R. Coulter
(74) *Attorney, Agent, or Firm*—McDonnell Boehnen Hulbert & Berghoff

(57) ABSTRACT

A method and apparatus for communicating a real time media input over a network. The apparatus encodes the input into data packets having a number of frames ordered according to a first variable. A receiving device unpacks and buffers the unpacked data packets for playout according to a second variable. The receiving device generates utility parameters for evaluating a dynamic characteristic of the network that transports the data packets. The receiving device selects a preferred utility parameter and adjusts the first and second variable according to the selected utility parameter. The method includes encoding an analog input into data packets that are transported to a receiving device. The method also includes unpacking the data packets, buffering the unpacked data packets according to a second variable, and generating at least two utility parameters that represent a dynamic characteristic of a network. The method also includes selecting a preferred utility parameter and adjusting the first and the second variables according to the selected preferred utility parameter.

64 Claims, 9 Drawing Sheets

OTHER PUBLICATIONS

Bolot et al., "Control Mechanisms for Packet Audio in the Internet", In *Proc. IEEE Infocom '96,* San Francisco, CA, pp. 232–239, Apr. 1996.

Perkins et al., "Options for Repair of Streaming Media", INTERNET–DRAFT, The University College London, pp. 1–10, Mar. 13, 1998.

* cited by examiner

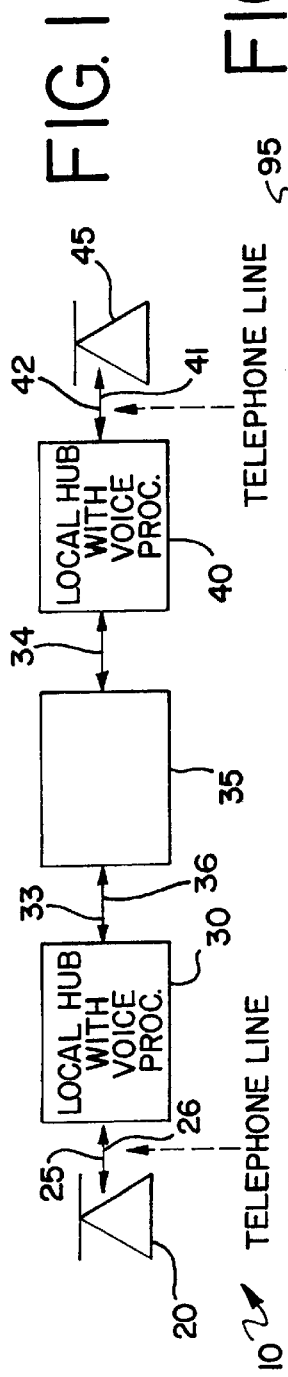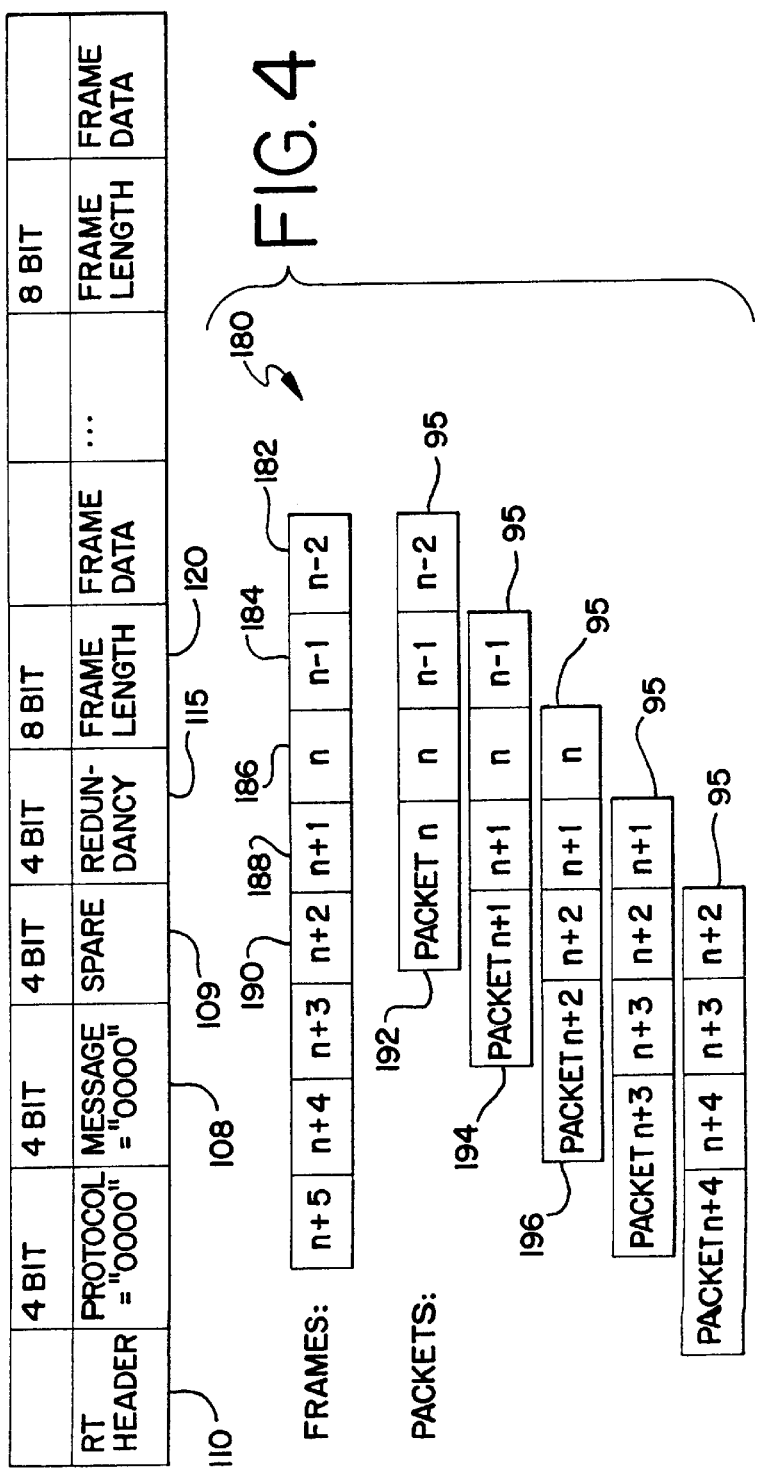

METHOD AND APPARATUS FOR REAL TIME COMMUNICATION OVER PACKET NETWORKS

COPYRIGHT NOTICE AND AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

This invention relates to the field of telecommunications and more specifically to a method and apparatus for real time communication over packet networks.

B. Description of Related Art and Advantages of the Invention

Real time communications such as audio or video can be encoded using various compression techniques. The encoded information can then be placed in data packets with time and sequence information and transported via non-guaranteed Quality of Service (QoS) packet networks. Non-guaranteed packet switched networks include a Local Area Network (LAN), Internet Protocol Network, frame relay network, or an interconnected mixture of such networks such as an Internet or Intranet. One underlying problem with non-guaranteed packet networks is that transported packets are subject to varying loss and delays. Therefore, for real-time communications, a tradeoff exists among the quality of the service, the interactive delay, and the utilized bandwidth. This tradeoff is a function of the selected coding scheme, the packetization scheme, the redundancy of information packeted within the packets, the receiver buffer size, the bandwidth restrictions, and the transporting characteristics of the transporting network.

One technique for transporting real time communication between two parties over a packet switched network requires that both parties have access to multimedia computers. These computers must be coupled to the transporting network. The transporting network could be an Intranet, an Internet, wide area network (WAN), local area network (LAN) or other type of network utilizing technologies such as Asynchronous Transfer Mode (ATM), Frame Relay, Carrier Sense Multiple Access, Token Ring, or the like. As in the case for home personal computers (PCs), both parties to the communication may be connected to the network via telephone lines. These telephone lines are in communication with a local hub associated with a central office switch and Network Service provider. As used herein, the term "hub" refers to an access point of a communication infrastructure.

This communication technique however, has a number of disadvantages. For example, for a home-based PC connected to a network using an analog telephone line, the maximum bandwidth available depends on the condition of the line. Typically, this bandwidth will be no greater than approximately 3400 Hz. A known method for transmitting and receiving data at rates of up to 33.6 kbits/second over such a connection is described in Recommendation V.34, published by the International Telecommunication Union, Geneva, Switzerland.

Aside from a limited bandwidth, various delays inherent in the PC solution, such as sound card delays, modem delays and other related delays are relatively high. Consequently, the PC-based communication technique is generally unattractive for real-time communication. As used herein, "real-time communication" refers to real-time audio, video or a combination of the two.

Another typical disadvantage of PC-based communication, particularly with respect to PC-based telephone communications, is that the communicating PC receiving the call generally needs to be running at the time the call is received. This may be feasible for a corporate PC connected to an Intranet. However, such a connection may be burdensome for a home based PC since the home PC may have to tie up a phone line.

Another disadvantage is that a PC-based conversation is similar to conversing over a speakerphone. Hence, privacy of conversation may be lost. Communicating over a speakerphone may also present problems in a typical office environment having high ambient noise or having close working arrangements.

In addition, PC-based telephone systems often require powerful and complex voice encoders and therefore require a large amount of processing capability. Even if these powerful voice encoders run on a particularly powerful PC, the encoders may slow down the PC to a point where the advantage of document sharing decreases since the remaining processing power may be insufficient for a reasonable interactive conversation. Consequently, a caller may have to use less sophisticated encoders, thereby degrading the quality of the call.

A general problem encountered in packet switched networks, however, is that the network may drop or lose data packets. Packets may also be delayed during transportation from the sender to the receiver. Therefore, some of the packets at a receiving destination will be missing and others will arrive out of order.

In a packet switched network whose transporting characteristics vary relatively slowly, the immediate past transporting characteristics can be used to infer information about the immediate future transporting characteristics. The dynamic network transporting characteristics may be measured using such variables as packet loss, packet delay, packet burst loss, loss auto-correlation and delay variation.

SUMMARY OF THE INVENTION

The present invention relates to a method and apparatus for communicating a real time media input. The apparatus includes an encoding device that encodes the media into a plurality of data packets. Each data packet includes a plurality of frames that are created according to a first variable. A receiving device unpacks the data packets and buffers the unpacked data packets for a playout according to a second variable. The receiving device generates a plurality of utility parameters for evaluating a dynamic characteristic of a transporting network. The transporting network transports the data packets from the encoding device to the receiving device. A preferred utility parameter is selected. The preferred utility parameter is used to adjust the first and the second variable.

In another aspect of the invention, an apparatus for communicating a real time media input includes a sender having an encoder and a packetizer. The encoder partitions and compresses the real time media input into a plurality of frames. The packetizer packets the frames into a plurality of data packets according to a redundancy value. A transporting network transports the data packets from the sender to a receiver. The receiver includes a real decoder and a plurality of computation decoders. The real decoder includes a real decoder depacketizer and a real decoder buffer. The real decoder depacketizer unpacks the plurality of frames. The frames are placed within the real decoder buffer according to a buffer length variable. Each computation decoder has a utility parameter for evaluating a dynamic characteristic of the transporting network. The computation decoder includes a computation decoder depacketizer and a computation decoder buffer. The computation decoder depacketizer unpacks the plurality of frames and communicates the frames to the computation decoder buffer. The receiver selects a preferred utility parameter from the utility parameters and communicates a feedback variable to the real decoder buffer. The buffer length variable is adjusted in accordance with a change in the dynamic characteristic.

In another aspect of the invention, a system for transmitting real time media includes a first calling device for placing a call to a first processing hub. The first processing hub includes an encoder that partitions the call into a plurality of compressed frames. A packetizer packetizes the frames into a data packet according to a redundancy variable. A transporting network transports the data packet between the first hub and a second hub. The second hub includes a decoder for decoding the data packet into the plurality of frames and ordering these frames within a buffer with depth according to a buffer length variable. The decoder generates a plurality of utility parameters based on the redundancy value and the buffer length variable. The decoder selects a preferred utility parameter from the utility parameters such that the redundancy value and the buffer length are adjusted in accordance with a change in the dynamic characteristic. A second calling device receives the call from the second processing hub.

In still another aspect of the invention, a method for communicating a real time media input includes the step of communicating the real time media input to a sending device and encoding the input into a plurality of data packets. Each data packet comprises a plurality of frames ordered according to a first variable. The data packets are transported to a receiving device where they are unpacked and buffered for a playout of the analog input according to a second variable. At least two utility parameters are generated for evaluating a dynamic characteristic of a transporting network that transports the data packets from the sending device to the receiving device. A preferred utility parameter is selected from the utility parameters. The first and the second variable are adjusted according to the preferred utility parameter.

In still another aspect of the invention, a method for communicating a real time media input includes the steps of partitioning and compressing the real time media input into a plurality of frames. The frames are packetized into a plurality of data packets according to an actual redundancy variable. The data packets are transported by a transporting network. The plurality of frames are unpacked and arranged within a buffer according to a buffer length variable. A plurality of utility parameters are generated for evaluating a dynamic characteristic of the transporting network. A preferred utility parameter is selected from the utility parameters wherein the buffer length variable is adjusted in accordance with a change in the dynamic characteristic.

In another aspect of the invention, a method for transmitting real time audio includes the steps of placing a call to a first processing hub. The call is partitioned and compressed at the first processing hub into a plurality of frames. The frames are packed into a data packet according to a redundancy value. The data packet is transported between the first processing hub and a second processing hub by a transporting network. The data packet is decoded at the second processing hub into the plurality of frames.. These frames are ordered within a second hub buffer according to a buffer length. A plurality of utility parameters are generated based on the redundancy value and the buffer length. A preferred utility parameter is selected from the utility parameters. The redundancy value and the buffer length are adjusted in accordance with a dynamic characteristic of the transporting network. The call is then received from the second processing hub.

These and many other features and advantages of the invention will become more apparent from the following detailed description of the preferred embodiments of the invention.

BRIEF DESCRIPTION OF THE DRAWINGS

FIG. 1 shows a general overview of a system for transporting a real time media input over a packet switched network and incorporating a preferred embodiment of the present invention.

FIG. 3 is block diagram of a data packet transported between the sender and the receiver shown in FIG. 2.

FIG. 4 shows an order of the redundant frames in five levels of data packets.

DETAILED DESCRIPTION OF THE PREFERRED EMBODIMENTS

Figure 2:
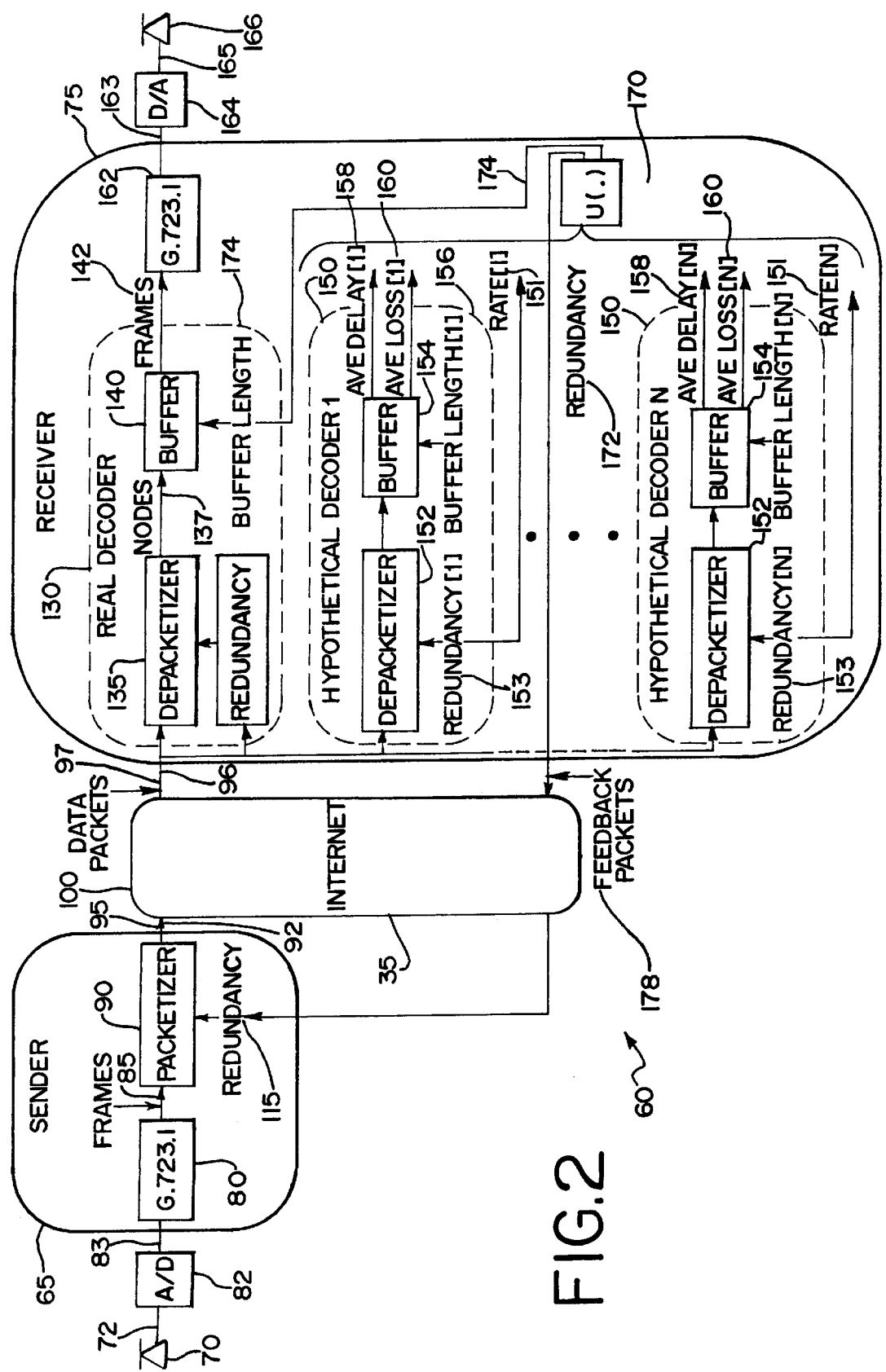
FIG. 2 illustrates a communication channel, including a sender and a receiver, in accordance with the system shown in FIG. 1.

FIG. 1 shows an overview of a system 10 for communicating a real time media input 25 and incorporating a preferred embodiment of the present invention. The system 10 includes a sending device 20, a first processing hub 30, a transporting network 35, a mapping service 31, a second processing hub 40 and a receiving device 45.

The sending device 20 is a calling device that generates the real time media input 25. Preferably, the real time media input 25 is a telephone call. Alternatively, the sending device 20 generates other types of real-time media inputs such as video, multimedia, streaming applications, or a combination thereof.

The input 25 is communicated over a telephone line 26 to the first processing hub 30. Preferably, the first hub 30 is a local hub and is commercially available from U.S. Robotics of Skokie, Ill. as U.S. Robotics Edgeserver™ bearing part number 1098-0. The first hub 30 processes the input 25 and converts the input 25 into a form that can be transported by the transporting network 35. The first hub 30 may include an encoding device for encoding the input 25 into a digital format. The hub 30 may then compress the digital format into a plurality of frames. These frames could be packetized into a sequence of data packets 36 comprising a plurality of data packets 33. The data packets 33 are then transported by the transporting network 35 to the second processing hub 40.

The mapping service 31 maps the phone number being called to an Internet Provider (IP) address of a receiving hub. Preferably, the receiving hub is a hub closest to the party receiving the call. In the system shown in FIG. 1, the receiving hub is the second processing hub 40.

The transporting network 35 transports the data packet sequence 36 to the selected receiving hub 40. Because various packets of the sequence 36 may be dropped or lost during transportation, the first packet sequence 36 may differ from the second sequence of data packets 37. The data packets 34 comprising sequence 37 are communicated to the second calling device 45 over a telephone line 41.

In this proposed scheme, the first device 20 can place a telephone call to the second calling device 45 in the following manner. Calling device 20 activates an Internet account by calling a toll free number. The Internet account then prompts the calling device 20 for identification. An identification number, such as a phone card number or a credit card number, is entered. The calling device 20 is then provided a number of a local processing hub (i.e., the first processing hub 30) based on the caller's identification number. The first hub 30 is consequently made aware that there is a new user in its area. Once the caller has been identified, the caller 20 calls its assigned local processing hub. The hub will then recognize the caller based on the caller's identification number. One advantage of this proposed identification scheme is that it facilitates billing the caller for usage and other types of service charges.

After identifying itself to the first hub 30, the caller is asked to enter the phone number that the caller wishes to call. The mapping service 31 maps the phone number to an IP address of a sending hub closest to the caller. This phone number facilitates selecting a receiving hub as close as possible to the location of the other party to the call. The selected receiving hub then places a call to the receiving party so that the call can proceed. The caller's voice is then transported as data packets between the sending and the receiving hub.

One advantage of the system shown in FIG. 1 is that the system samples and compresses the communicated information in close proximity to the transporting network. Preferably, sampling and compressing are performed in the processing hubs 30, 40. By performing these tasks inside the processing hub as opposed to, for example, inside a PC, more computation power is available at the sending or receiving end of the call. Therefore, more complex encoders and transporting schemes can be utilized. More sophisticated billing schemes can also be implemented. For example, the price of a telephone conversation can be correlated with the quality and the delay of that particular telephone call. System 10 can also accurately measure one-way delay and can therefore compensate the transportation of data packets based on the varying transporting characteristics of the transporting network 35.

The transporting network 35 is a packet switched network and preferably the Internet. An Internet is one type of packet switched network: it is a network of networks. The Internet is divided into thousands of autonomous systems ("AS") that are individual networks controlled by an administrative agency. The range of AS sizes can vary greatly. For example, a single company with a single Ethernet local area network ("LAN") is an AS. A large AS, such as a telephone company ATM backbone spanning the breadth of the United States is also an AS. Therefore, the term Internet, as that term is used herein, is a meta-network in that it is a scheme for inter-connecting different AS's such that data can be transported between AS's. Currently, the Internet spans over 140 countries and includes approximately 13 million individual hosts. The term "host," as used herein, is a computer or access point having a unique Internet Protocol (IP) address.

Alternatively, aside from the Internet, other types of AS's that can be used to transport the stream of data packets between the first and second hub 30, 40 include nationwide backbones, regional backbones, local Internet providers, online services, Wide Area Networks (WANs), LANs, Intranets, university networks and corporate networks. The transporting network 35 transports the sequence of data packets from the first processing hub 30 to the second processing hub 40.

The second processing hub 40 receives the sequence of data packets 37. The sequence received 37 differs from the sequence transported 36 because of packet loss and packet delays that frequently occur in packet switched networks. The received data packets 33 are decoded by the second hub 40. The second hub first unpacks the packets and then decompresses this information. This decompressed information is then ordered within a buffer. The buffer of information is then played out and converted to an analog signal 41. The analog signal 41 is then sent over telephone line 42.

Prior to sending the analog signal 41 over the telephone line 42, the second hub 40 may call the second calling device 45. The second calling device 45 then plays out the analog input 26. The second calling device 45 can generate information and transport this information to the first calling device 20 in a similar fashion.

Preferably, the first and the second calling devices 20, 45 of system 10 shown in FIG. 1 are each associated with telephone call participants. Participants can therefore place telephone calls over a regular telephone rather than have to use a PC speakerphone system. Because telephones are generally more common than PCs, the proposed system 10 will be more available to the public. Telephones also provide a more natural user interface to those individuals who do not use or who are uncomfortable using computers.

Alternatively, the sending and receiving devices 20 and 45 are electronic communicating devices such as modems, facsimile machines, network computers, PCs, pagers, hand-held communicating devices, personal distal assistants or like devices that communicate audio, video, multimedia or similar applications.

Since the first and second calling devices 20, 45 can simultaneously act as both an originator and a receiver of information, an interactive transporting environment requires bi-directional transportation of information. Such an interactive environment is shown in FIG. 1 where the first calling device 20 has been described as both the sender and the receiver of telephone calls. To provide a more detailed discussion as to how the system 10 performs interactive bidirectional communication between the first and the second processing hubs 30, 40, packet transportation from the first hub 30 acting as a sender to the second hub 40 acting as a receiver will be discussed.

FIG. 2 illustrates a communication channel 60 in accordance with the system shown in FIG. 1. The communication channel includes a sender 65 and a receiver 75. The sender 65 may, for example, be included within the first hub 30 shown in FIG. 1. The receiver 75 may be included within the second hub 40 shown in FIG. 1. It should be realized, however, that in an interactive environment where information is transported bi-directionally, a processing hub will normally include both sender 65 and receiver 75 thereby enabling the hub to receive and transmit information simultaneously.

Returning to FIG. 2, the sender 65 includes an encoder 80 coupled to a packetizer 90. A first stream of data packets 95 generated by the packetizer 90 is transported by a transporting network 35. The receiver 75 receives a stream of data packets 96. The stream of data packets 96 is supplied to a real decoder 130 and a number of computation decoders 150. The real decoder 130 includes a depacketizer 135 coupled to a buffer 140. Preferably, the depacketizer 135 operates in accordance with a first variable. Preferably, the first variable is an actual Redundancy variable 115. The size of the real decoder buffer 140 varies in accordance with a BufferLength variable 174. The buffer 140 is coupled to a decoder 162. The decoder 162 provides a digital input 163 to a digital-to-analog converter 164 (i.e., D/A converter 164). The D/A converter 164 provides signal 165 to the second calling device 166 for playout.

In an alternative embodiment, the first variable is a vector of values. These vectors may represent a plurality of variables providing further control of the communication channel. For example, such variables could be used for identifying the type of codings above being used by the sender, a redundancy parameter, and other types of control identifiers.

The computation decoders 150 are arranged in parallel to the real decoder 130. In this configuration, the computation decoders 150 and the real decoder 130 receive the stream of data packets 96. The stream 96 comprises transported data packets 97. Each computation decoder 150 includes a computation decoder depacketizer 152 and a computation decoder buffer 154.

The operation of the communication channel 60 will now be described with reference to FIG. 2. A first calling device 70 generates a real time media signal 72, preferably a telephone call. Alternatively, the signal 72 is video, multimedia, a streaming application or a combination thereof. The signal 72 is communicated to an analog-to-digital converter 82 (i.e., A/D converter 82). The A/D converter 82 converts the signal 72 to a digital signal 83. Preferably, where the signal 72 is a phone call, the digital signal 83 is a digital speech wave form.

The digital signal 83 is communicated to an encoder 80 of the sender 65. In the case of a phone call, the digital signal 83 is communicated to the encoder 80 over a telephone line. The digital input 83 (preferably in Pulse Code Modulated (PCM) form) is compressed and partitioned by encoder 80 into a sequence of frames 85. The encoder 80 encodes the digital signal 83.

Preferably, in the case where the communication channel 60 is used to communicate voice, the encoder 80 is an ITU voice encoder complying with Recommendation G.723.1. Recommendation G.723.1 describes a code excited linear predictive encoder (CELP). This recommendation G.723.1 specifies a coded representation used for compressing speech or another audio signal component of multimedia services at a low bit rate as part of the overall H.324 family of standards. Recommendation G.723.1 is entitled "DUAL RATE SPEECH ENCODER FOR MULTIMEDIA COMMUNICATIONS TRANSMITTING AT 5.3 & 6.3 KBITS/S" and is published by the Telecommunication Standardization Sector of the ITU. Recommendation G.723.1 is herein entirely incorporated by reference. Alternatively, voice encoders complying with other standards or specifications can be used.

Preferably, the digital input 83 to the encoder 80 is a digital speech waveform sampled at 8000 Hz. Each sample of the input 83 is represented by a signed 16 bit integer. The encoder 80, preferably the G.723.1 encoder, segments the input 83 into frames 85. Preferably, each frame is 30 milli-seconds (ms) in length. At the preferred sampling rate of 8000 Hz, 30 ms represents 240 samples.

The preferred G.723.1 encoder can operate at two different bit rates, a low rate of 5.3 kbits/seconds or a high rate of 6.3 kbits/seconds. In the high rate setting of 6.3 kbit/s, 480 bytes (i.e., 240 samples times 2 bytes/sample) are compressed to 24 bytes. In this high rate setting, where the input 72 is voice, the encoding results in a quality that is close to toll quality. In the low rate setting of 5.3 kbits/s, 480 bytes are compressed to 20 bytes. Therefore, between the low and high rate setting, the compression ratio varies from 20 to 24.

Preferably, the encoder 80 utilizes silence detection. The preferred G723.1 silence detection uses a special frame entitled Silence Insertion Descriptor (SID) frame. SID frame generation is described in Recommendation 6,723.1 which has been herein entirely incorporated by reference. During a "silence", as that term is used herein, no voice data frames are generated by the encoder 80. An SID frame defines when a silence begins. After the encoder 80 transmits an SID frame, no further voice data frames are transmitted until the current silence ends. Updated SID frames may, however, be sent. This silencing technique reduces the required overall transfer rate. Moreover, as will be discussed, silence detection allows for a dynamic adjustment of the depth of the real decoder buffer 140. The communication channel 60 can thereby compensate for varying transportation characteristics of the transport network 35.

The packetizer 90 packets the frames 85 into a plurality of data packets 92. Preferably, the packetizer 90 places a time stamp and a sequence number into each data packet 92. The time stamp identifies the time a specific data packet 92 was created. The sequence number identifies data packet ordering. Each data packet 92 includes both a current frame as well as redundant information such that a number of previously packeted frames might be reconstructed if some frames are lost during transportation. In one implementation, the number of previous frames or redundant frames is channel coded according to the actual Redundancy variable 115 of the communication channel 60. The actual Redundancy 115 is the variable that determines the number of previous frames packet into each data packet 92. The data packets 92 are ordered in a data packet sequence 95 and transported by the transporting network 35 to the receiver 75.

Each data packet time stamp enables the receiver 75 to evaluate certain dynamic transporting characteristics of the transporting network 35. These transporting characteristics determine how the packetizer 90 packetizes the frames 85 and how the receiver 75 unpacks these frames. These varying transporting characteristics can include such characteristics as the standard deviation of one-way delay or the round trip time for each transported data packet 97. The round trip time is calculated by transporting a copy of the time stamp back to the sender 65 and comparing the received time with the timestamp value. The standard deviation of one-way delay is typically approximated by averaging the absolute value of differences between time stamp values and received times for each packet 97. Alternatively, if real time protocol (RTP) is used, data packet sequence numbers and time stamps are placed within the RTP header. The sequence numbers and timestamps do not, therefore, need to be reproduced in the data packet payload. Other transport protocols that contain timestamps and sequence number information can also be used in place of the RTP protocol.

The receiver 75 receives a sequence of data packets 96. This sequence of data packets 96 may vary from the sequence of data packets 95 originally communicated to the transporting network 35. The variance between the two data packet sequences 95, 96 is a function of varying transporting characteristics such as packet loss and packet transport times.

Because the preferred transporting network 35 is a non-guaranteed packet switched network, the receiver 75 receives packets out of order vis-a-vis other data packets comprising the originally transported packet sequence 97. To combat this occurrence, as previously mentioned, the packetizer 90 adds sequence numbers to the frames 85 before the frames are packetized. As will be discussed with reference to the real decoders 130, the receiver 75 has a real decoder buffer 140 that stores the data from the unpacked frames. As long as the sequence number of an arriving packet 97 is greater than the sequence number of the frame being played out by the buffer 140, the sequence number is used to put the unpacked frame at its correct sequential position in the real decoder buffer 140. Therefore, the larger the size of the buffer 140, the later a frame can arrive at the receiver 75 and still be placed in a to-be-played-out frame sequence. On the other hand, as the size of the buffer 140 increases, the larger the overall delay can be in transporting the input 83 from the sender 65 to the receiver 75.

The receiver 75 includes a real decoder 130, a decoder 162 and a plurality of computation decoders 150. The real decoder depacketizer 135 receives the data packet sequence 96. Initially, the depacketizer 135 reads the actual Redundancy variable 115 contained in each data packet 97. Using the actual Redundancy variable 11 5, the depacketizer 135 unpacks the data packets 97 and recovers the frames 85. The frames 85 include both current and redundant frames.

The real decoder 130 reads the sequence number and the time stamp of a current frame. Redundant frames associated with the current frame have the same time stamp as the current frame since, within a given packet, redundant and current frames were both originally communicated from the packetizer 90 at approximately the same point in time. Since the order or sequence of the redundant frames is known, the redundant frame sequence numbers can be inferred from the current frame sequence number.

Preferably, each frame, together with its corresponding time stamp and sequence number, defines a node 137. The nodes 137 are forwarded to a real decoder buffer 140 for buffering. Redundant frames are not buffered if an original frame has been previously buffered. The buffered frames are then passed on to a decoder 162. The decoder 162 decompresses the frames 142. The decompressed frames 163 are then forwarded to a digital-to-analog converter 164 (i.e., D/A converter 164). The D/A converter 164 converts the digital data 163 to an analog output 165. This analog output 165 represents the original analog input 72 generated by the first calling device 70. The analog output 165 is forwarded to the second calling device 166 where the output 165 is then played out.

By monitoring various transporting characteristics of the transporting network 35, the present communication channel 60 offers a number of advantages. For example, the present communication channel can adapt to varying transporting dynamics and conditions of the transporting network 35. For a non-guaranteed packet switched network, the network transporting dynamics can be assessed by a packet delay distribution and a packet loss percentage, both of which generally vary over time.

In general, as the length of the real decoder buffer 140 increases, the quality of the played out analog output 169 also increases. Unfortunately, as in the case of transporting a telephone call over the transporting network 35, if the network packet delay is large, maintaining an interactive conversation may be difficult. On the other hand, if the real decoder buffer length is quite small (i.e., small in comparison to the standard deviation of network delay), frames with larger delays will arrive too late to be played out and will consequently be considered lost during transportation over the network 35. Therefore, it is preferred that the real decoder 130 have a buffer 140 that has a variable buffer length. Preferably, the buffer length will vary in accordance with the dynamic transporting characteristics of the network 35.

More preferably, the buffer length is proportional to the variance in delay experienced by the transported data packets 97. A non-guaranteed packet switched transporting network, such as transporting network 35, having a highly varying data packet delay results in an increased buffer length. Conversely, where a transporting network experiences a more constant data packet delay, the buffer length will be decreased.

A buffer length of X milliseconds is employed where X is a dynamic parameter. Utilizing a buffer having a dynamic buffer length of X milliseconds, after the arrival of an unpacked node 137 from the real decoder depacketizer 135, X milliseconds must on average time out before the buffer 140 can start playing out at a constant rate of 1 frame per 30 milliseconds. Alternatively, the buffer 140 plays out at the frame rate used by the encoder 80.

Preferably, the buffer 140 is implemented as having a doubly linked list (LL) structure. In such a preferred structure, the nodes 137 are ordered according to their respective sequence number. Each node 137 contains a pointer that points to the preceding and succeeding nodes in the structure. Each node 137 is inserted into the buffer 140 at the appropriate linked list position. If a node already exists in the buffer 140, the redundant node is discarded. Moreover, if the sequence number of the frame being played out 163 by the decoder 162 is greater than the sequence number of an arriving node 137, then the arriving node 137 arrived too late and is discarded. Based on the frame length of the encoder 80, the buffer 140 plays out frames 142 at periodic instances of time. Preferably, as in the case for a G.723.1 encoder, the buffer 140 plays out one frame every 30 ms.

As shown in FIG. 2, the receiver 75 contains N computation decoders 150. These N computation decoders 150 are arranged in parallel with the real decoder 130. Preferably, the number of computation decoders N is a product of the cardinality of the domain of two variables: the Redundancy and the BufferLength. As noted previously, the Redundancy defines the number of previous frames packeted into each data packet 92. The BufferLength variable defines the number of nodes 137 buffered by the real decoder buffer 140 before play-out occurs. As the BufferLength increases, fewer nodes 137 will arrive too late to be played-out by the buffer 140.

Like the real decoder 130, the computation decoders 150 receive and observe the data packets 97 of the incoming data packet sequence 96. Each computation decoder 150 includes a computation decoder depacketizer 152 coupled to a computation decoder buffer 154.

The computation decoders 150 operate differently than the real decoder buffer 140. One difference is that the computation decoders 150 do not read the actual Redundancy variable 115 from an arriving data packet 97. Rather, each individual computation decoder uses an assigned fixed Redundancy [i] variable 153. This fixed Redundancy 153 is used to extract the frames 85 from the transported data packet 97. The fixed Redundancy [i] variable is a hypothetical Redundancy value and is used by computational decoder [i], and is an index to the computation decoders [i . . . N].

Each computation decoder 150 computes various characteristics of the transporting network 35. Preferably, each computation decoder 150 computes an AveDelay [i] and an AveLoss [i]. Each computation decoder 150 also has an assigned Rate [i] 151.

Even when the actual Redundancy variable 115 of a data packet 97 is less than the fixed Redundancy [i] parameter 153 of a corresponding computation decoder 150 [i], the computation decoder 150 computes two utility parameters: AveLoss [i] 160 and AveDelay [i] 158.

The AveLoss [i] parameter 160 is a measure of the average number of the originally transported data packets 95 lost during transportation. In addition, the AveLoss [i] parameter takes into account the data packets 92 originally transported but accounted for as being lost during transportation since these packets were received too late to be played out by the buffer 140. AveLoss [i] 160 provides one method to quantify a difference between the data packets 95 originally sent by the sender 65 and the data packets 97 actually received by the receiver 75.

The AveDelay [i] parameter 158 is a measure of the average time it takes for the data packets 92 to be transported from the sender 65 to the receiver 75. The AveDelay [i] parameter 158 preferably also includes the time required for the buffer 140 to playout the frames 142. These measures are computed from the time stamp and sequence number associated with the transported data packets 92. In this case, AveDelay [i] 158 is equal to the sum of the one way delay plus the receiver buffer time. The receiver buffer time can be estimated by multiplying the receiver Buffer Length by the period of the frame rate. The one way delay is estimated by adding an estimate of the network delay to the Receive Buffer Delay.

AveLoss [i] 160 is determined by the flow chart algorithm of the computation decoder as will be discussed with reference to FIG. 12.

The fixed Redundancy variable 153 associated with each computation decoder can be greater than, less than, or equal to the actual Redundancy variable 115. When a particular fixed Redundancy [i] variable 153 of a corresponding computation decoder [i] 150 is greater than the actual Redundancy variable 115, some of the frames 85 of the data packet 97 are unavailable to the computation decoder 150. This does not matter, however, since the computation decoder 150 only requires the time stamp and the sequence number of a received data packet 97. Moreover, the time stamp and the sequence number for all the redundant frames can be inferred. These values can be inferred since time stamps remain unchanged and sequence numbers are in sequential order for the hypothetical case of the computation decoder. This is true even when the actual Redundancy parameter 115 and a fixed Redundancy [i] parameter 153 differ.

Each computation decoder has three unique values associated with it. The three values of each computation decoder AveDelay, AveLoss and Rate defines the utility of the computation decoder for a given data packet transportation. As shown in FIG. 2, the three values AveDelay [i] 158, AveLoss [i] 160 and Rate [i] 151 of each computation decoder 150 are analyzed by a utility function 170. The utility function 170 selects the optimal computation decoder that would have resulted in the highest utility for a transported data packet.

The utility of a particular computation decoder 150, and therefore the utility of the overall receiver 75, is application specific. Preferably, the utility is a function of the average delay AveDelay 158, the average loss rate AveLoss 160 and the Rate 151. Rate is a measure of the bandwidth required to transport the media stream which is increasing with redundancy. Since the AveLoss rate is a function of the actual Redundancy parameter 115, the utility function 170 is preferably a function of three network transmission characteristics represented by these three variables. The utility function 170 preferably has the following form U(AveDelay, AveLoss, Redundancy) and if separability is desired, it may be expressed as follows:

U(AveLoss, AveDelay, Redundancy)=$U_L$(AveLoss)*$U_D$(AveDelay)*$U_R$(Redundancy)

where $U_L$(AveLoss) is the loss utility function, $U_D$(AveDelay) is the delay utility function, and $U_R$(Redundancy) is the Redundancy utility function. Alternatively, the utility function can be expressed in other forms, such as a non-seperable, non-linear function in the form of a table.

The general purpose of the utility function 170 is to rate the different type computation decoders 150. In this manner, the computation decoding values of Redundancy [i] and BufferLength [i] that would have optimized data packet transportation at a given time is selected. These optimal values determine the new values for the actual Redundancy 115 and the BufferLength 174.

The utility function 170 is application specific and can be modified to best fit the type of analog input 72 being transported. The application's specific nature of the utility function can be explained by way of the following example. If a specific type of application calls for a maximum loss rate of 10%, a loss utility function $U_L$ can be represented by the graph shown in FIG. 14. As shown in this graph, as long as the loss rate is less than or equal to 10%, the loss utility function $U_L$ will be equal to 1. Any loss rate greater than 10% will result in the loss utility function $U_L$ to be equal to zero (0).

Figure 15:
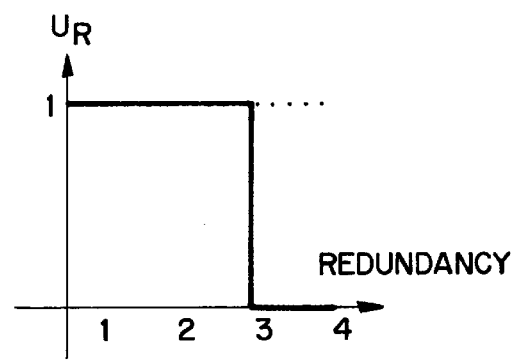
FIG. 15 is a graph of a Redundancy utility function $U_R$ having a Redundancy less than or equal to three (3).

In this example, it is further assumed that the specific application is not overly concerned with redundancy as long as no more than three (3) redundant frames are used. The resulting redundancy utility function $U_R$ can be expressed graphically as shown in FIG. 15. According to FIG. 15, as long as the redundancy utility function $U_R$ is equal to or less than three (3), the utility function $U_R$ will equal one (1). Any Redundancy greater than three (3) will result in a redundancy utility function $U_R$ equal to zero (0).

The third concern in this example is the data packet transportation delay. Returning to the example discussed with respect to FIGS. 14 and 15 and given the above $U_L$ and $U_R$, it will be assumed that the example will require a delay of less than or equal to one (1) second. Any greater delay will result in the delay utility $U_D$ equal to zero (0). This requirement can be graphically represented as shown in FIG. 16.

Figure 14:
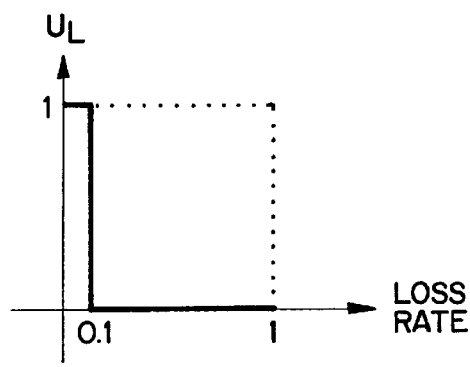
FIG. 14 is a graph of a loss utility function $U_L$ having a loss rate less than or equal to ten (10).
Figure 16:
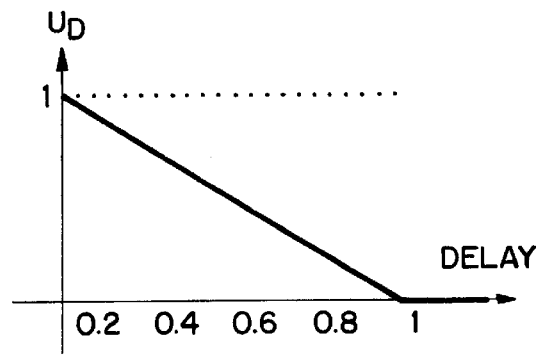
FIG. 16 is a graph of delay utility function $U_D$ having a delay less than or equal to one (1) second.

Taking the utility functions $U_L$, $U_R$, and $U_D$ shown in FIGS. 14, 15, and 16, respectively, one can define an overall utility function U(AveLoss, AveDelay, Redundancy) to be the product of these three individual utility functions. A computation decoder that maximizes this function will specify in an average loss less than or equal to 10%, specify three or fewer redundant frames and specify the smallest possible average delay, given the first two constraints.

Figure 17:
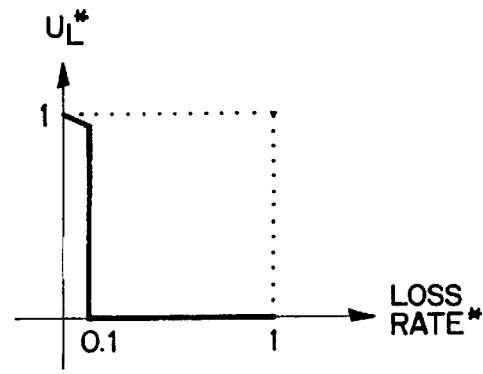
FIG. 17 is a graph of modified loss utility function $U_L^*$ of the utility function $U_L$ shown in FIG. 14.
Figure 18:
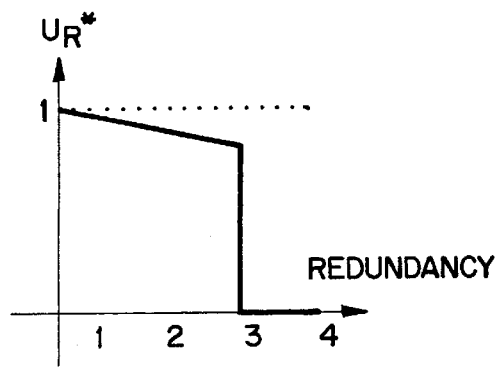
FIG. 18 is a graph of a modified redundancy utility function $U_R^*$ of the redundancy utility function $U_R$ shown in FIG. 15.

Preferably, where two computation decoders 150 result in exactly the same delay $U_D$, the decoder 150 using the lesser amount of redundancy $U_R$ or that results in the smaller loss rate $U_L$ is selected. Preferably, this selection process is accomplished by slightly altering the loss and redundancy utility function $U_L^*$ and $U_R^*$, respectively. For example, a modified loss rate $U_L^*$ and a modified Redundancy rate $U_R^*$ is shown in FIGS. 17 and 18, respectively.

The Redundancy value 172 and BufferLength value 174 of the optimal computation decoder are utilized as follows. First, the Redundancy value 172 is packetized into a feedback data packet 178 that is transported to the packetizer 90 of the sender 65. The sender 65 adjusts the actual Redundancy variable 115 based on the new Redundancy value 172.

Secondly, the optimal BufferLength value is communicated to the real decoder buffer 140. The real decoder buffer 140 uses the preferred BufferLength value 174 to buffer the nodes 137. Preferably, the Redundancy and BufferLength are chosen periodically with intervals of one (1) to ten (10) seconds in a typical implementation.

It is important to note that the fixed Redundancy values 153 and the fixed BufferLength values 156 associated with the computation decode 150 are constant. These values are therefore not adjusted according to the transmission characteristics of the transporting network 35. Rather, it is the function of all the computation decoders 150, by using all possible Redundancy value 153 and BufferLength 156 combinations, to determine an optimal value of these two variables based on the transport characteristics of the network 35 at a given time.

The preferred computation decoder 150 has highest utility for a given data packet transportation and therefore provides the best choice of system variables given the network conditions at a given time. This allows for the flexibility of using a variety of utility functions for different types of applications. For example, for a streaming application, or a one way communication, the AveDelay $U_D$ can be quite a bit larger than for an interactive application. On the other hand, a streaming application may require a higher quality than the interactive call or video conference application.

The real decoder decompression scheme matches the encoder scheme used to compress the input 83. Preferably, the decoder 162 is a G.723.1 decoder where the input to the decoder is a frame stream. The output of the decoder 160 is a waveform in the same format as the analog input 83 for the G.723.1 encoder.

FIG. 3 illustrates the structure of a data packet 92 transported by the communication channel shown in FIG. 2. Preferably, each data packet has a data packet header that is a thirty-two (32) bit word containing a Redundancy parameter 115, a current frame and a plurality of redundant frames. The RT Header 110 is a Real Time Protocol header containing a sequence number and time stamp. The Real Time Protocol contains a field which identifies how the remainder of the data packet is interpreted. Packets of 95 or 96 may be Real Time Protocol packets which contain packets from the protocol described here.

In a preferred embodiment, the message data 108 reads 0000 for data packets 92 transmitted from the sender 65 to the receiver 75. For the feedback packet 178 sent from the receiver 75 to the sender 65, the message data 108 of the packet reads 0001. This message data field allows the sender 65 and the receiver 75 to differentiate between data and feedback packets. The feedback packet 175 preferably does not contain a frame length or frame data. Rather, the feedback packet 175 contains information relating to the desired value to be used for the actual Redundancy variable 115. The header spare 109 is reserved for later use for data packets from sender to receiver. For data packets sent from the sender to the receiver, the Redundancy 115 variable represents the number of additional previous frames that each data packet 95 contains. The Frame Length 120 represents the length of the following frame data field in bytes.

FIG. 4 illustrates an example of a preferred order of the redundant frames in five levels of data packets wherein the actual Redundancy variable 115 is set equal to two (2). With a Redundancy variable set equal to 2, the packetizer 90 packs two previously transmittal frames into each data packet 95. For example, as shown in FIG. 4, with respect to Frame n 186, Packet n 192 contains Frame n 186 and its two previous frames: Frame n−1 184 and Frame n−2 182. Similarly, Packet n+1 194 contains Frame n+1 188, along with its two previous frames: Frame n 186 and Frame n−1 188. Packet n+2 196 contains Frame n+2 190 along with its two previous frames: Fame n+1 188 and Frame n 186. In a scheme having an actual Redundancy variable 115 equal to two (2) therefore, each packet 95 includes a current frame along with the two previous frames.

Figure 5:
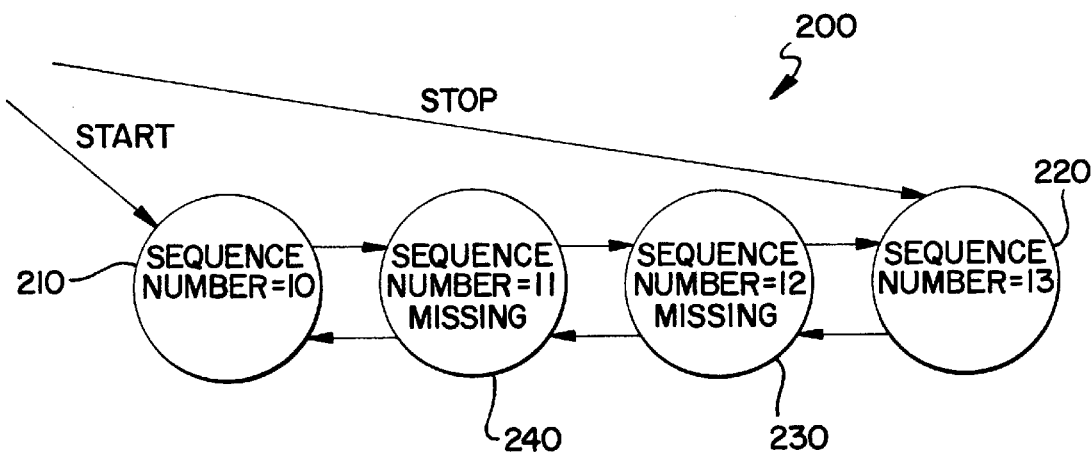
FIG. 5 is an illustration of a linked list structure of a real decoder buffer shown in FIG. 2.

FIG. 5 illustrates an example of a preferred double linked list (LL) 200. This example has a Start node 210 having a sequence number equal to 10 and a Stop node 220 having a sequence number equal to 13. The preferred real decoder buffer implementing the LL 200 keeps track of the first or Start node and the last or Stop node. In a preferred embodiment, the LL 200 contains all the nodes having sequence numbers that fall between a Start node and a Stop node.

If the real decoder buffer 140 receives a frame within node 137 having a sequence number 10 and another frame with sequence number 13, then the LL creates all the nodes falling between and including the Start and Stop nodes, i.e., 10, 11, 12, 13 (i.e., element numbers 210, 240, 230 and 220, respectively). All four nodes 10, 11, 12, and 13 will be created even though frame sequence number 11 and frame sequence number 12 have not yet been received. The created nodes 230 and 240 are marked as missing.

Figure 7:
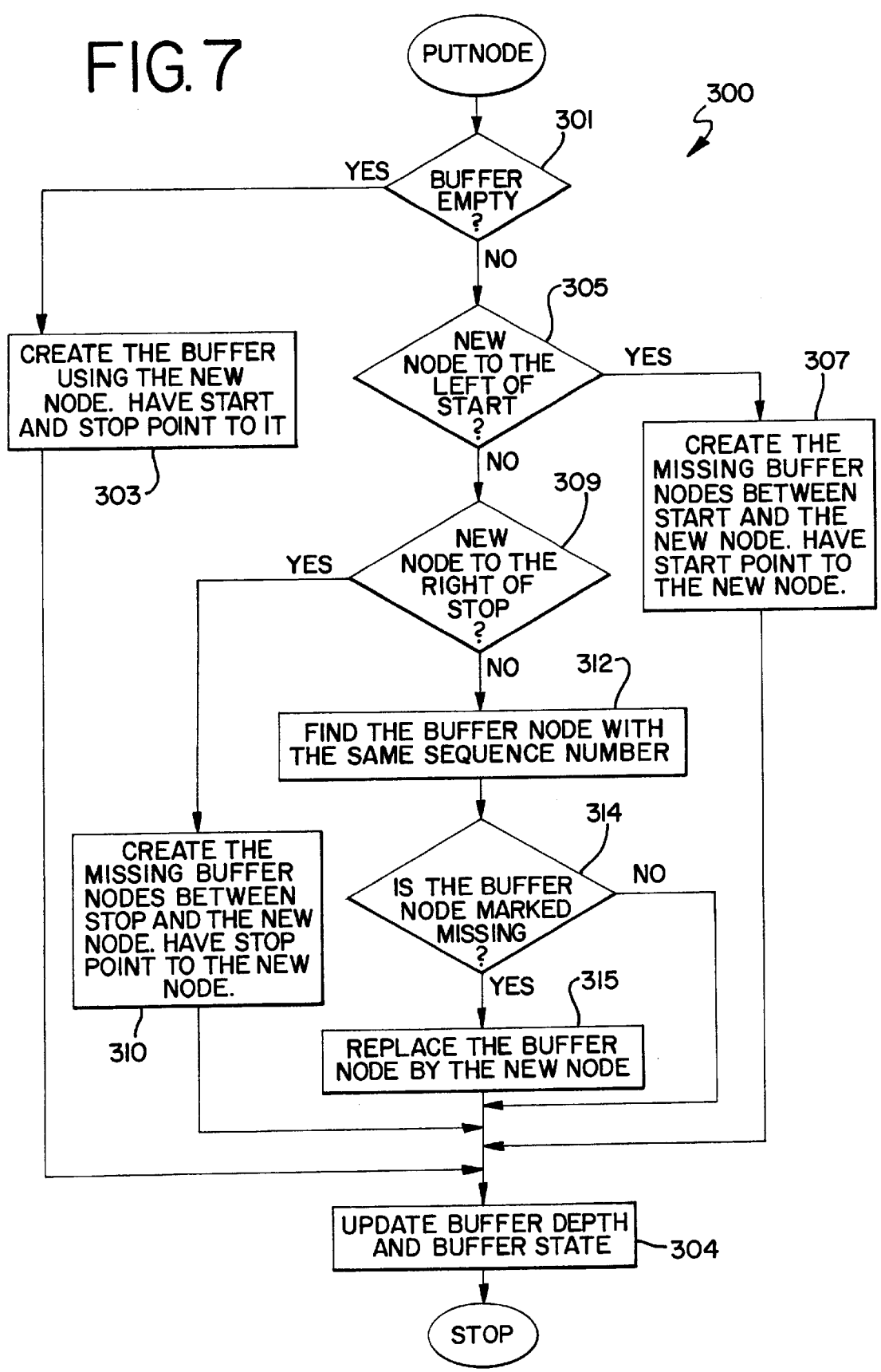
FIG. 7 is a flowchart of a PutNode function for the real decoder shown in FIG. 2 and which accesses the linked list structure shown in FIG. 5.

Two functions are provided for accessing the LL 200. The first function is the PutNode function. The LL 200 utilizes the PutNode function to insert a node in the correct LL position. FIG. 7 illustrates a flowchart of a PutNode function 300 for the real decoder 130 shown in FIG. 2. After receiving a node 137 from the depacketizer 135, the PutNode function 300 must determine where to put this node. The PutNode function 300 first determines whether the real decoder buffer 140 is empty 301. If the real decoder buffer is empty, the function 300 creates the buffer using the new node at step 303. A Start and a Stop pointer associated with this new node now point to this new node at step 303. The function 300 then updates the real decoder buffer depth and the real decoder buffer state at step 304.

Alternatively, if the buffer 140 is not empty, then at step 305 the PutNode function 300 determines whether the new node should be placed to the left of the existing Start node 305. If the new node should be placed to the left of the existing StartNode, then at step 307 the missing buffer nodes are created between the existing StartNode and the new node. The new start will now point to the new node. The PutNode function 300 then updates the real decoder buffer depth and the real decoder buffer state at step 304.

If the PutNode function 300 determines that the new node should not be placed to the left of the existing StartNode, then at step 309 the PutNode function 300 determines whether the new node should be placed to the right of the existing Stop node. If the new node should be placed to the right of the existing Stop node, then the missing buffer nodes between the Stop node and the new node are created at step 310. The Stop pointer will now point to the new node 310. The PutNode function 300 then updates the real decoder buffer depth and the real decoder buffer state at step 304.

If the PutNode function 300 determines that new mode is not to be placed to the left of the existing Start node or to the right of the existing Stop node, then the function 300 finds the existing buffer node with the same sequence number at step 312. The PutNode function 300 then determines whether the buffer node is marked as missing at step 314. If the buffer node has been marked as missing, the buffer node is replaced by the new node at step 315. The function 300 then updates the real decoder buffer depth and the real decoder buffer state at step 304. If the buffer node has not been marked as missing, then the function 300 updates the real decoder buffer depth and real decoder buffer state at step 304 without replacing the buffer node.

Figure 6:
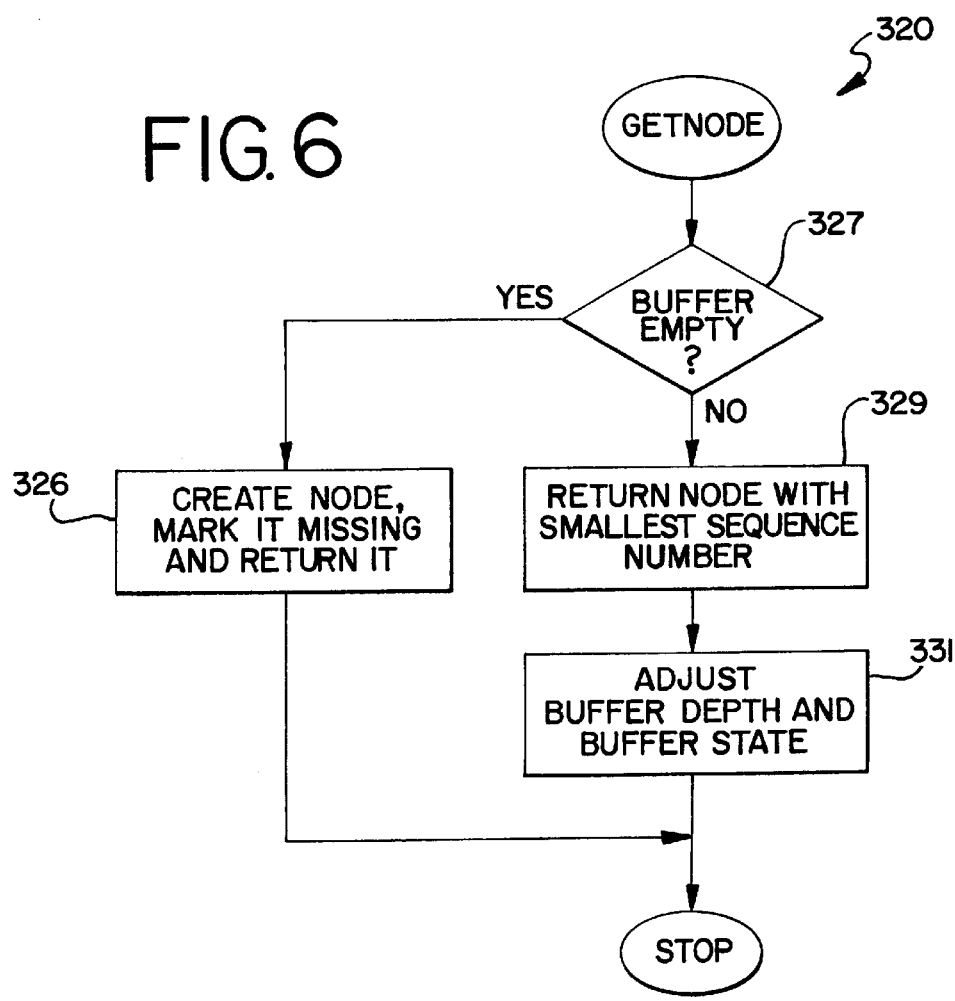
FIG. 6 is a flowchart of a GetNode function for accessing the linked list shown in FIG. 5.

The second function for accessing the LL 200 is the GetNode function. The buffer 140 utilizes the GetNode function for retrieving a node 137 having the smallest sequence number. A flowchart of the GetNode function 325 is illustrated in FIG. 6. At step 327, the GetNode function 325 first determines whether the real decoder buffer 140 is empty. If the buffer 140 is empty, then at step 326 a node is created. The newly created node is marked as missing and the node is returned to the buffer 140. If the buffer 140 is not empty, then at step 329 the node having the smallest sequence number is returned. The GetNode function 325 then adjusts the real decoder buffer depth and buffer state at step 331.

Depending on the buffer depth, the buffer 140 can be in one of three different states: Fill, Normal and Drain. These transitions are controlled by the SetNode and PutNode functions. These three states Fill, Normal and Drain can be represented by the state transition diagram 350 illustrated in FIG. 8. This state transition diagram 350 shows how the real decoder buffer 140 changes state, depending on the buffer depth and the current state of the buffer.

Figure 8:
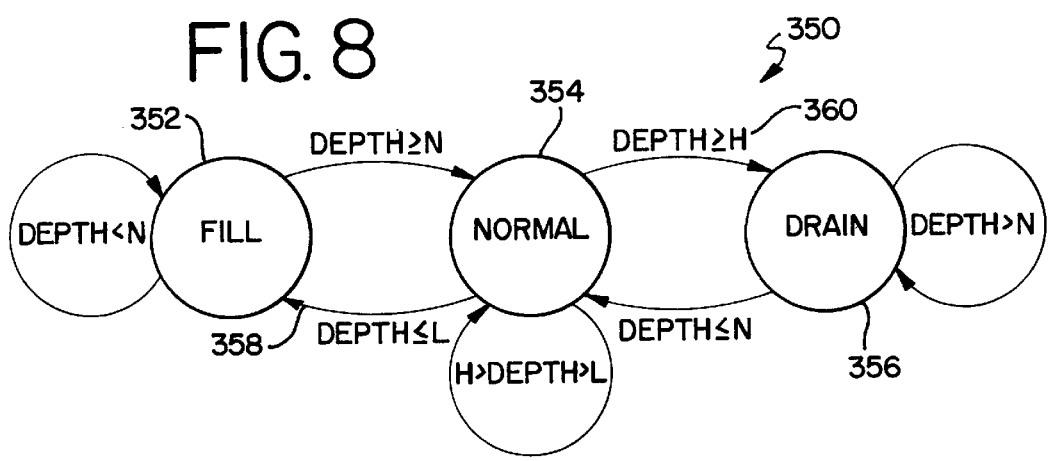
FIG. 8 illustrates a state transition diagram of the real decoder buffer illustrated in FIG. 2.

There are three critical buffer watermarks shown FIG. 8: Low (L), Normal (N), and High (H). The objective of the state diagram 350 is to maintain the buffer in its Normal state 354. For example, if while in the Normal state, the buffer depth falls below Low, the buffer changes state from the Normal state 354 to the Fill state 352 as shown in transition 358. The objective of the Fill state is to bring the buffer depth back to the Normal state 354. This objective may be achieved by artificially lengthening the next silence period until enough data packets arrive to return the buffer depth back to the Normal state 354. As long as the buffer depth stays between Low and High watermarks, the buffer state remains in the Normal state 354. If the buffer depth goes below the Low watermark 358, the buffer state switches back to the Fill state 352. If the buffer depth increases above the High watermark as shown by transition 360, the buffer state changes to the Drain state 356. The objective of the Drain state 356 is to shorten the silence periods and therefore reduce the buffer depth until it is returned to the Normal state 354. As long as the buffer depth is greater than N, the buffer will remain in the Drain state 356. Once the buffer depth is less than or equal to N as shown in transition 357, the buffer will become Normal again.

Preferably, the buffer control attempts to keep the buffer depth around the set BufferLength. This can be accomplished by setting the Normal water mark (N) equal to the BufferLength, the Low watermark (L) equal to half of the BufferLength and the High watermark (H) equal to 1.5 times the BufferLength.

There are basically two events associated with the real decoder buffer 140. The first event is the arrival of the data packet 96. The second event is defined as a TimeOut.

Figure 11:
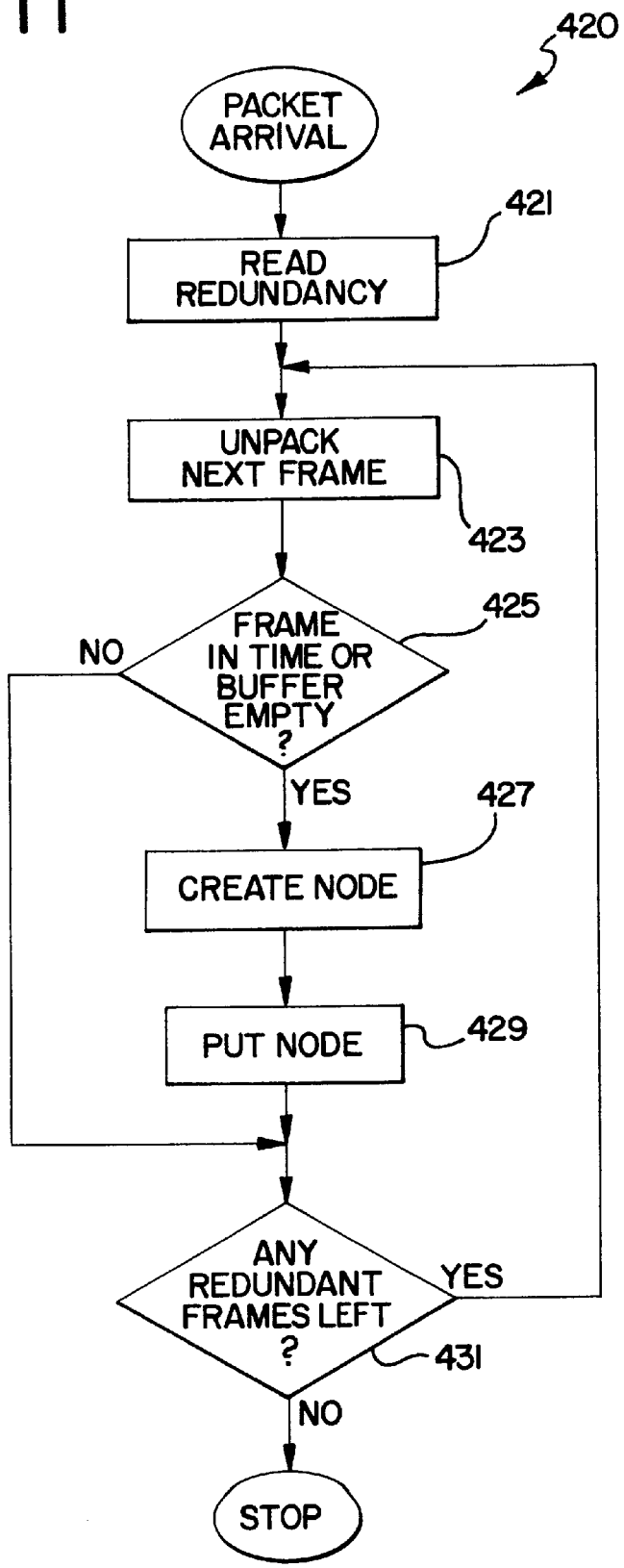
FIG. 11 is a flowchart of a PacketArrival function for the real decoder shown in FIG. 2.

The arrival of the data packet is defined as a PacketArrival. The arrival of transported data packets 96 is an asynchronous event and occurs whenever the real decoder 130 and computation decoders 150 receive a data packet. FIG. 11 provides a flowchart for the PacketArrival function 420 of the real decoder 130. After the data packet 96 is received, the real decoder 130 reads the actual Redundancy variable 115 at step 421 and unpacks the next frame at step 423. The PacketArrival function 420 then determines whether the frame has arrived in time for buffer play out or if the buffer is already empty at step 425. If the frame has arrived in time for play out and the buffer is empty, then a node is created at step 427. The PutNode function 300 as described with reference to FIG. 7 is then implemented at step 479. If the frame arrives late or if the buffer is not empty, it is determined whether any redundant frames are left 431. If redundant frames remain at step at step 431, then the frame unpacking and node generation process returns to step 423.

Figure 13:
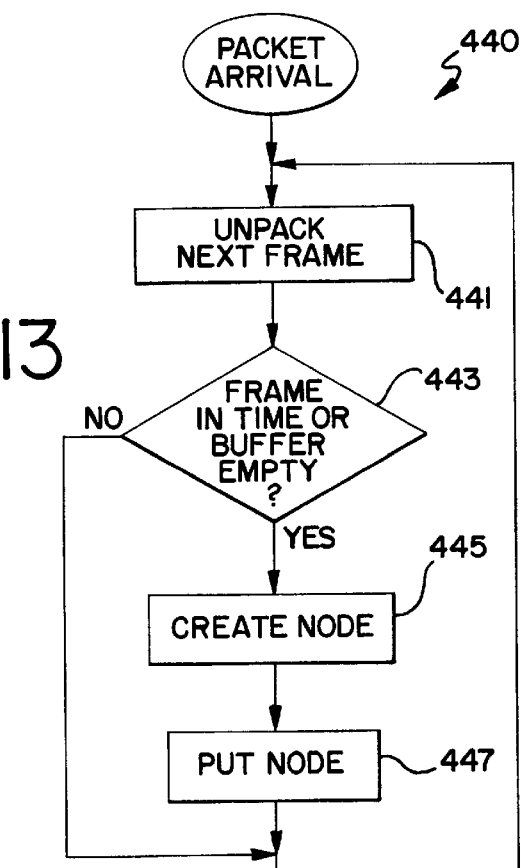
FIG. 13 is a flowchart of a PacketArrival function for one of the computation decoders shown in FIG. 2.

FIG. 13 provides a flowchart for the PacketArrival function 440 of the computation decoders 150. Once a data packet is received by a computation decoder 150, the computation decoder 150 unpacks the frames at step 441. At step 443, The PacketArrival function 440 determines whether the unpacked frame was received in time for play out and if the buffer is empty. If both are true, then a node is created at step 445 and the PutNode function 300 (shown in FIG. 7) is implemented at step 447. The PacketArrival function 440 then proceeds to determine whether any other redundant frames remains at step 449. If more frames remain, the PacketArrival function 440 returns to step 441.

If the frame was received late or it the buffer is not empty, the PacketArrival function 440 determines whether any redundant frames are remaining at step 449. If any frames are left at step 449, then the process returns to step 441 and the next frame is unpacked. In the computational decoder, the actual data frames do not need to be stored in the buffer. Instead, the buffer may be marked with an indication of a data frame being unpacked and stored.

Figure 9:
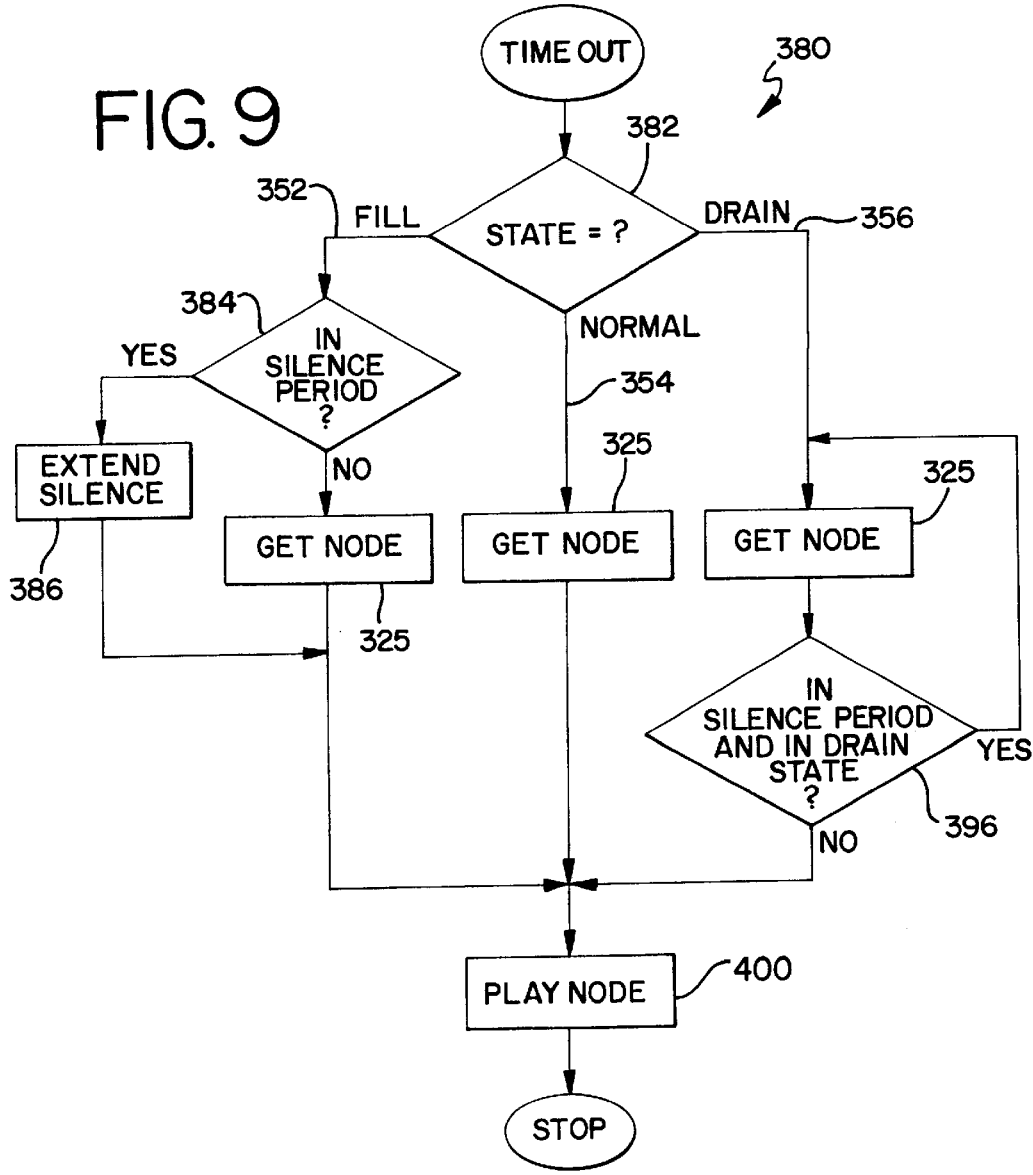
FIG. 9 illustrates a flowchart of a Time Out function for the real decoder buffer shown in FIG. 2.

The second event associated with the real decoder 130 is defined as a TimeOut. The TimeOut event is periodic and fixed to the frame size of the encoder 80. As previously discussed, the frame size and resulting TimeOut for the preferred G.723.1 system occurs every 30 milliseconds. FIG. 9 illustrates a flow chart for the TimeOut event 380.

At step 382, the TimeOut function 380 first determines the state of the buffer. If the buffer 140 is in the Fill state 352, the TimeOut function 380 proceeds to determine whether a silence period is detected at step 384. If a silence period is detected, the silence period is extended at step 386 until the buffer state switches to Normal 354. The function then returns to step 400 and executes the PlayNode function as previously described and shown in FIG. 12. If a silence period is not detected, the TimeOut function 380 implements the GetNode function 325 as previously described with reference to FIG. 6. After the GetNode function is implemented at step 325, the TimeOut function 380 returns to step 400, the PlayNode function, and the frame with the lowest sequence number is taken out of the buffer and played out.

If the TimeOut function 380 determines that the buffer is in the Drain state 356, the GetNode function as previously described with reference to FIG. 6 is implemented at step 325. After the GetNode function at step 325 is implemented, the TimeOut function 380 proceeds to step 396 to determine whether a silence period is detected and whether the buffer 140 is in the Drain state. If both are detected, the function 380 returns to the GetNode function 325. If both are not detected, the TimeOut function 380 returns to the PlayNode function at step 400.

If the TimeOut function 380 determines that the buffer is in the Normal state 354, the function 380 proceeds to the GetNode function 325. The TimeOut function 380 then returns to the PlayNode function at step 400.

Figure 10:
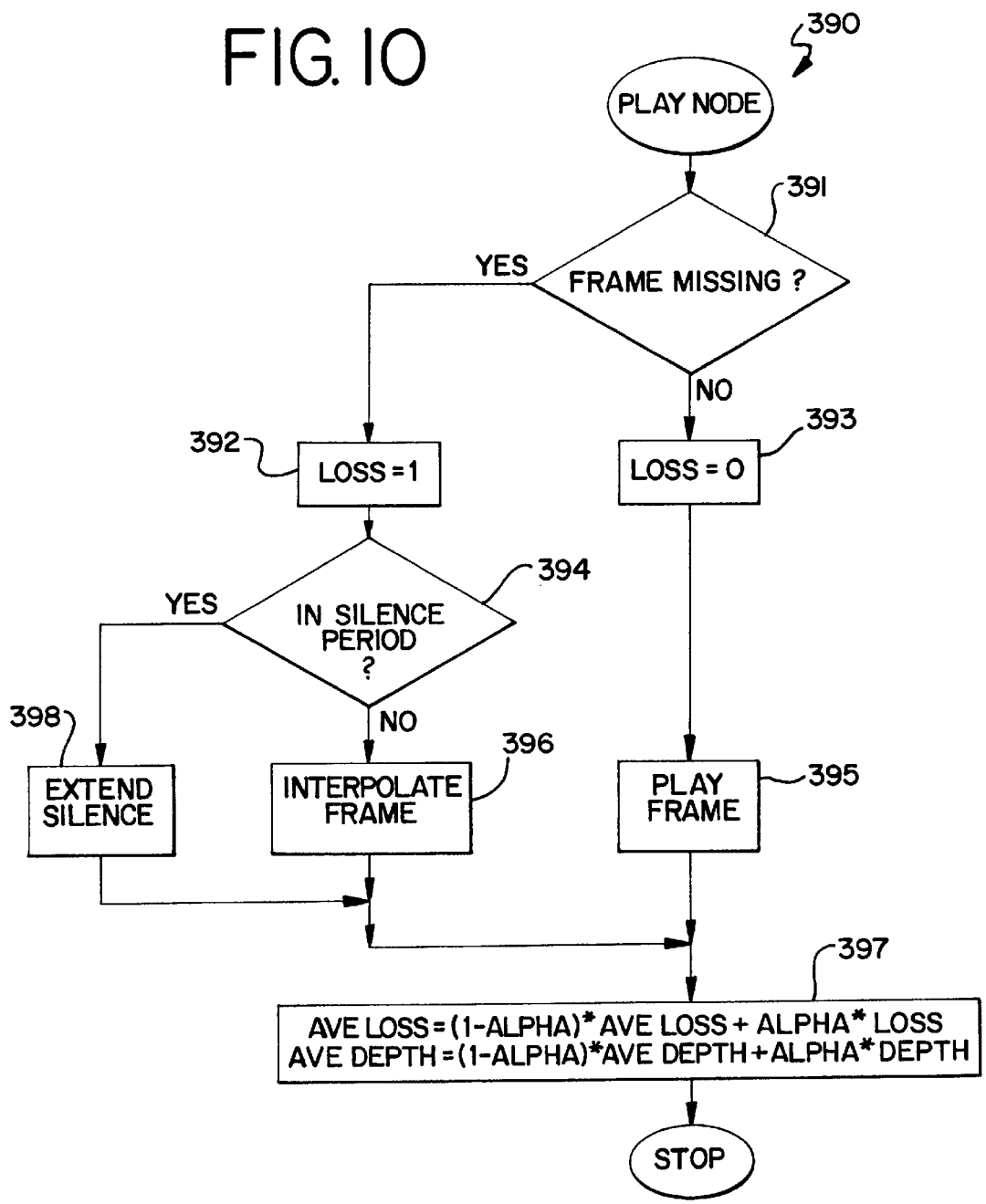
FIG. 10 illustrates a flowchart of a PlayNode function for the real decoder shown in FIG. 2.

There are two different types of PlayNode functions. The first is the real decoder 130 PlayNode function 390 is illustrated in FIG. 10. The second is the computation decoder PlayNode function 400, illustrated in FIG. 12. The purpose of the first PlayNode function 390 is to send the frame data to the playout decoder 160 which is called for whenever a TimeOut occurs. It is therefore invoked periodically with the period being equal to the encoder 80 frame length. The PlayNode function 390 first determines whether a frame is missing at step 391. If no frame is missing, the function 390 proceeds to step 393 where a loss bit is set to zero (0). Next, the frame is played at step 395. The AveLoss and AveDepth statistics are then updated at step 397.

If the first PlayNode function 390 determines at step 391 that a frame is missing, then the function 390 proceeds to step 392 where the loss bit is set to one (1). Next, the function 390 determines whether a silence period is detected at step 394. If a silence period is detected, then the silence is extended at step 398. If a silence period is not detected at step 394, then a frame is interpolated at step 396. This effectively plays a frame that is an estimation of the missing frame. The AveLoss and AveDepth statistics are then updated at step 397.

Figure 12:
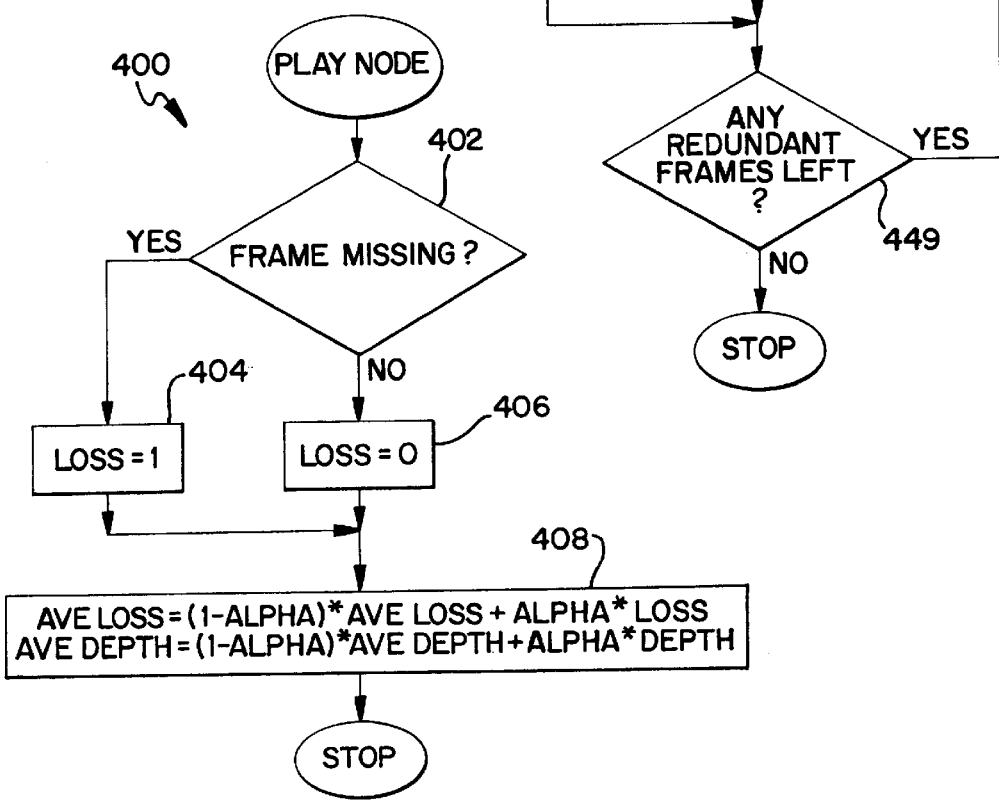
FIG. 12 illustrates a flowchart of a PlayNode function for one of the computation decoders shown in FIG. 2.

The second type of PlayNode function 400 is that of the computation decoders 150 and is illustrated in FIG. 12. The second Playnode function 400 first determines at step 402 whether a frame is missing. The second Playnode function 400 sets a loss bit equal to one (1) if the frame is missing at step 404. The loss is set to zero (0) if the frame is not missing. The second PlayNode function 400 then updates the AveLoss and the AveDepth statistics of the transporting network with these new values at step 408.

The preferred utility function 170 evaluates or maps the new value of the variable Bufferlength 174 and a new value of the variable Redundancy 115. The variable BufferLength 174 is altered by first changing the three watermarks as described with reference to the buffer state diagram 350 and then changing the buffer states 352, 354 and 356. The Normal watermark value in the real decoder will change to the new BufferLength variable. Other watermark values (High and Low) may be determined either by alogrithm or by copying some values from computational decoder which yielded the largest utility parameter. If a larger buffer state is changed to a smaller one, then the adjustment of the buffer state may result in a Drain state 356. Consequently, the buffer 140 starts shortening the silence periods. If the buffer is increased, then the adjustment of the buffer state may result in a Fill state 352. Consequently, a subsequent silence period will be extended until the buffer fills up to the Normal watermark 354. The new Redundancy variable will be communicated back to the sender.

Although the forgoing description of the preferred embodiment will enable a person of ordinary skill in the art to make and use the invention, a detailed C++ language program listing is included below. The program is entitled buffer.cpp and contains routines associated therewith. The program is an implementation of a buffer class for a receiver of the Internet telephony scheme. Additional detailed features of the system will become apparent to those skilled in the art from reviewing these programs.

While the invention has been described in conjunction with presently preferred embodiments of the invention, persons of skill in the art will appreciate that variations may be made without departure from the scope and spirit of the invention. This true scope and spirit is defined by the appended claims, as interpreted in light of the foregoing.

```
          //

// buffer.cpp

//

// 12/16/96, Guido Schuster, gschuste@usr.com
          //

// Advanced Technologies, Network System Division, U.S. Robotics

//

//
          // This is the implementation of a buffer class for a receiver buffer // of an Internet telephony scheme

//

// Its main purpose is to formalize the details and to guide future development.

// This is the appendix to a high level description, which can be requested
          // from the author.

//

// Note that this is the test implementation of a real decoder and the changes

// necessary to make this a hypothetical decoder are indicated in the high level // description
          //
```

```
    #include <iostream.h>
    #include <stddef.h>

   class DecoderClass
    {
        public:

// Types

            // Frame modes:
            // Voice            : Frame is voiced
            // Silence          : Start of silence has been detected for this frame
            // ExtendedSilence  : Last transmitted frame was a Silece frame, and so is this one,
            //                    hence no information needs to be transmitted. The
            //                    ExtendedSilence mode is signaled with a frame length of 0.
            //                    Hence it is not an explicit mode.
            // Missing          : This frame did not arrive
            enum Mode_t {Voice, Silence, ExtendedSilence, Missing};
```

```
            // Overloads the << operator so the modes can be printed friend ostream& operator<< (ostream& os, Mode_t Mode)

{

                    switch(Mode)

{ case Voice: os << "Voice"; break;

case Silence: os << "Silence"; break;

case ExtendedSilence: os << "ExtendedSilence"; break;

                            case Missing: os << "Missing"; break;

} return os;

};

// The frame type

// The setup of this structure is for testing purposes only.

// In a real implementation, the Mode variable is not required

// since it can be infered from the frame data.

            // On the other hand, the frame data variable is needed to store

// the frame typedef struct Frame_t
```

```
            {
                    int Length;      // The length of the frame in bytes // This is for testing only,
                    // Voice and Silence are explicit modes,
                    // ExtendedSilence is infered if the Frame length is zero
                    // Missing is not a transmitted mode
                    Mode_t Mode;

// In a real implementation, this is where the data
                    // would be stored.

// FrameData_t FrameData
            };

// The packet type
            // For this test implementation, we did not include the Protocol,
            // the MessageType nor the Spare.
            // Also we set the number of possible frames per packet arbitrarily
            // to 3, clearly in a real implemenation a more elegant solution would be used
```

```
          typedef struct Packet_t
          {
              int Seq;        // Sequence Number
              int TimeStamp;
              // int Protocol;
              // int MessageTyp;
              // int Spare;
              int Redundancy;     // Number of frames per packets
              Frame_t Frame[3]; // Memory space for those frames, set arbitrarily to 3
10        };

private:
          // Types
          // Buffer states
          // Fill     : The buffer is low and needs to be filled up
          // Normal   : Everything is fine
          // Drain    : The Buffer is too full and needs to be drained.
          enum State_t {Fill, Normal, Drain}; // Buffer states // overloading the << operator so that the state can be printed out
```

```
            friend ostream& operator<< (ostream& os, State_t State)

{ switch(State)

{

                    case Fill: os << "Fill"; break;

case Normal: os << "Normal"; break;

case Drain: os << "Drain"; break;

} return os;

            };

// Storage unit for the doubly linked list (LL)

// Also the name for a frame which has a time stamp and a sequence number typedef struct Node_t

            { struct Node_t *Next; // pointer to the next member struct Node_t *Prev; // pointer to the previous member Mode_t Mode;         // for convenience, this info is also in the frame int Seq;             // sequence number
                int TimeStamp;       // time stamp Frame_t *Frame_p;    // frame data

};
```

```
        // Variables
        Node_t *Start, *Stop;      // Beginning and End of LL
        Mode_t PreMode;            // Mode of the previously played frame
        State_t State;             // the state of the buffer
        int Depth;                 // Buffer depth
        int L, N, H;               // Watermarks, Low, Normal, High
        int Redundancy;            // the number of transmitted frames,
                                   // this is fixed for a hypothetical
   decoder,
                                   // while for the real decoder this is
        read from the packet
        float AveLoss,AveDepth;    // Smoothed loss and depth stats.
        float Alpha;               // the geometric forgetting factor for the smoothing

// Functions
        void AdjustStateDepth(void);   // recalculates Depth and adjust State
        void PutNode(Node_t *Node_p);  // inserts a node into the LL
        Node_t *GetNode(void);         // returns Node with lowest Seq, removes
        node from LL
        void PlayNode(Node_t *Node_p); // Play frame corresponding to node
```

```
        int GetSeq(Packet_t *Packet_p);      // Extract sequence number from packet
            int GetTimeStamp(Packet_t *Packet_p); // Extract time stamp from packet
            int GetRedundancy(Packet_t *Packet_p); // Extract redundancy from packet
            Frame_t *GetFrame(Packet_t *Packet_p, int i); // Extracts the Frame from packet
            Mode_t GetMode(Frame_t *Frame_p); // Extracts Mode from packet public:
            void TimeOut(void);                          // a time-out occured
        void PacketArrival(Packet_t *Packet_t);   // a packet arrived
            void Init(int BufferLength);            // Initialize the buffer
          void GetStats(float *MeanLoss, float *MeanDepth); // Get statistical data
        DecoderClass(int BufferLength)          // constructer
            {Init(BufferLength);}};
        };

DecoderClass::Frame_t* DecoderClass::GetFrame(Packet_t *Packet_p, int i)
        {
            return &(Packet_p->Frame[i]);
        }
```

```
DecoderClass::Mode_t DecoderClass::GetMode(Frame_t *Frame_p)

{ return Frame_p->Mode;

    } void DecoderClass::Init(int BufferLength)

{

        Start=NULL;   // There is no LL yet

Stop=NULL;

N=BufferLength;      // setting of the watermarks int Delta = BufferLength/2;   //This is somewhat arbitrary H=N+Delta;

        L=N-Delta;

AveLoss= (float)0.0;   // initilize the smoothed statistics

AveDepth= (float) 0.0;

Depth = 0;        // initilize the buffer depth

PreMode = Silence;   // By definition

        State=Fill;

Alpha = (float) 0.1; // Smoothing parameter     1>alpha>0

// Small alpha, large smoothing
```

```
                                                    // large alpha, little smoothing
    }

   void DecoderClass::GetStats(float *MeanLoss, float *MeanDepth)

{
            // Acess function to get to the loss and depth statisitics
            *MeanLoss=AveLoss;
            *MeanDepth=AveDepth;
    } void DecoderClass::TimeOut(void)
    {
            // This function is called when the playout timer expires.
            int repeat;
        Node_t *Node_p;

switch (State)
            {
                case Fill:
                    if (PreMode==Silence || PreMode==ExtendedSilence)
```

```
                {
                        // create a node which extends the silence
                        Node_p = new Node_t;
                        Node_p->Mode =ExtendedSilence;
                }
                else
                {
                        Node_p=GetNode();
                }
        break;

case Normal:
                Node_p=GetNode();
        break;

        case Drain:
                do
                {  // remove nodes which belong to a silence period
                        Node_p=GetNode(); //In GetNode, the state is adjusted
                        if ((PreMode==Silence || PreMode==ExtendedSilence) &&
        State==Drain &&
```

```
                              (Node_p->Mode==ExtendedSilence    ||    Node_p-
>Mode==Missing))
                                    {
                                        repeat=1;
                                        delete Node_p;
                                    }
                                else
                                    {
                                        repeat=0;
10                                  }
                            }
                        while (repeat);
                    break;
                }

15

PlayNode(Node_p);
        }

    void DecoderClass::PacketArrival(Packet_t *Packet_p)

{
            // This function is called when a packet arrives.
```

```
        int Seq, TimeStamp, Redundancy, i;
        Node_t *p;

       Seq = GetSeq(Packet_p);
        TimeStamp = GetTimeStamp(Packet_p);
        Redundancy = GetRedundancy(Packet_p);

for (i=0; i<=Redundancy; i++)
        { if ( Start == NULL || Start->Seq <= Seq-i)
                // Buffer empty OR frame in time
                {
                        // Create node
                        p                       = new Node_t;
                        p->Next                 = p->Prev = NULL;
                        p->Seq                  = Seq-i;
                        p->TimeStamp            = TimeStamp;
                        p->Frame_p              = GetFrame(Packet_p,i);
                        p->Mode                 = GetMode(p->Frame_p);
```

```
                    PutNode(p);
                }
            }

        }

        void DecoderClass::AdjustStateDepth(void)

{
            // recalculate the buffer depth and adjust the buffer state
            if (Start == NULL)
            {
                Depth = 0;
            }
            else
            {
                Depth = Stop->Seq - Start->Seq+1;
            } switch (State)
```

```
    {
        case Fill:
            if (Depth >= N) State = Normal;
            break;

        case Normal:
            if (Depth >= H) State = Drain;
            if (Depth <= L) State = Fill;
            break;

        case Drain:
            if (Depth <= N) State = Normal;
            break;
    }

    cout << "Depth:" << Depth << " State:" << State <<'\n';
}

    DecoderClass::Node_t* DecoderClass::GetNode(void)
    {
        Node_t *p;
```

```
         if (Start==NULL) // Nothing in the LL

{

// make up a Node which is missing
                  p = new Node_t;

p->Mode = Missing;

} else

{

                  if (Start == Stop ) // only one element in LL

{ p = Start;

Start = NULL;

Stop  = NULL;

                  } else // the normal case

{ p = Start;

Start = Start->Next;

                           Start->Prev = NULL;

}
```

```
                AdjustStateDepth();

} return p;
        } void DecoderClass::PlayNode(Node_t *Node_p)

{
            int Loss;

if (Node_p->Mode == Missing)

{

Loss = 1;
                if (PreMode == Silence || PreMode == ExtendedSilence)

{

PreMode = ExtendedSilence;

cout << "Frame Erasure, Played as Silence\n";

}
            else

{

PreMode = Missing;
```

```
                    cout << "Frame Erasure, Interpolated\n";
                }
            }
            else
            {
                cout << "Play Seq:" << Node_p->Seq << "\tMode:" << Node_p->Mode <<'\n';
                PreMode = Node_p->Mode;
                Loss = 0;
            } delete Node_p;

AveLoss  = (1-Alpha)*AveLoss  + Alpha*Loss;
            AveDepth = (1-Alpha)*AveDepth + Alpha*Depth;

//cout << "AveLoss:" << AveLoss << " AveDepth:" << AveDepth << '\n';

} int DecoderClass::GetSeq(Packet_t *Packet_p)

{
            return Packet_p->Seq;
```

```
        } int DecoderClass::GetTimeStamp(Packet_t *Packet_p)

{
                return Packet_p->TimeStamp;

} int DecoderClass::GetRedundancy(Packet_t *Packet_p)

{
                return Packet_p->Redundancy;

} void DecoderClass::PutNode(Node_t *Node_p)

        { int i;

Node_t *p;

if (Start==NULL || Stop==NULL) //LL does not exist yet

                {

Start=Stop=Node_p;

Start->Next=Stop->Prev=NULL;
```

```
            }
        else // LL exists
        {
            if (Start->Seq > Node_p->Seq) // node to the left of start ?
            {
                p=Node_p;
                for (i=Node_p->Seq+1; i< Start->Seq; i++) // the seq's of the missing nodes
                {
                    p->Next=new Node_t; // create the missing nodes
                    p->Next->Prev=p;
                    p=p->Next;
                    p->Seq=i;
                    p->Mode=Missing;
                }
                p->Next = Start;
                Start->Prev=p;
                Start=Node_p;
                Start->Prev=NULL;
            }
            else // node not to the left of start
            {
```

```
                    if (Stop->Seq < Node_p->Seq) // node to the right of stop ?
                    {
                            p=Node_p;
                            for (i=Node_p->Seq-1; i> Stop->Seq; i--) // the seq's of the missing
        nodes
                            {
                                    p->Prev=new Node_t;
                                    p->Prev->Next=p;
                                    p=p->Prev;
                                    p->Seq=i;
                                    p->Mode=Missing;
                            }
                            p->Prev=Stop;
                            Stop->Next=p;
                            Stop=Node_p;
                            Stop->Next=NULL;
                    }
                    else // Node between start and stop
                    {
                            // find the corresponding node
                            p=Start;
                            while(p->Seq != Node_p->Seq)
```

```
                    {
                            p=p->Next;
                    }
                    // p points to the node in the LL with the same seq
                if (p->Mode == Missing)    // the stop node can never be marekd Missing!
                    {                                              // hence we don't need to treat that case
                    if (Node_p->Seq == Start->Seq) // the same seq as the start node?
                            {
                                    Node_p->Prev = Stop->Prev;
                                    Node_p->Next = NULL;
                                    Stop->Prev->Next = Node_p;
                                    delete Stop;
                                    Stop = Node_p;
                            }
                    else // the node is not start
                            {
                                Node_p->Next = p->Next;
       ,
                                Node_p->Prev = p->Prev;
                                p->Prev->Next = Node_p;
```

```
                                        p->Next->Prev = Node_p;

delete p;

}

}

                   }

}

}

AdjustStateDepth();

     }

     void main(void)

{
          // A simple example and test of the class

DecoderClass Buffer(5);

          DecoderClass::Packet_t Packet[10]=
          {
               {1,0,1,
```

```
            {
                    {6,DecoderClass::Voice},
            }
        },
        {2,0,1,
            {
                    {6,DecoderClass::Voice}
            }
        },
10      {3,0,1,
            {
                    {6,DecoderClass::Voice},
            }
        },
15      {4,0,1,
            {
                    {6,DecoderClass::Voice},
            }
        },
20      {5,0,1,
            {
                    {6,DecoderClass::Voice},
```

```
                    }
                },
                {6,0,1,
                    {
                        {6,DecoderClass::Voice},
                    }
                },
                {7,0,1,
                    {
                        {6,DecoderClass::Voice}
                    }
                },
                {8,0,1,
                    {
                        {6,DecoderClass::Voice},
                    }
                },
                {9,0,1,
                    {
                        {6,DecoderClass::Voice},
                    }
                },
```

```
                {10,0,1,
                    {
                            {6,DecoderClass::Voice},
                    }
                }
            };

Buffer.PacketArrival(&(Packet[0]));
            Buffer.PacketArrival(&(Packet[1]));
            Buffer.PacketArrival(&(Packet[2]));
            Buffer.PacketArrival(&(Packet[3]));
            Buffer.PacketArrival(&(Packet[4]));
            Buffer.PacketArrival(&(Packet[5]));
            Buffer.PacketArrival(&(Packet[6]));
            Buffer.PacketArrival(&(Packet[7]));
            Buffer.PacketArrival(&(Packet[8]));
            Buffer.PacketArrival(&(Packet[9]));
                Buffer.TimeOut();
                Buffer.TimeOut();
                Buffer.TimeOut();
                Buffer.TimeOut();
                Buffer.TimeOut();
```

```
            Buffer.TimeOut();

Buffer.TimeOut();

Buffer.TimeOut();

Buffer.TimeOut();

           Buffer.TimeOut();

Buffer.TimeOut();

Buffer.TimeOut();

Buffer.TimeOut();

Buffer.TimeOut();

10          Buffer.TimeOut();

Buffer.TimeOut();

Buffer.TimeOut();

Buffer.TimeOut();

Buffer.TimeOut();

15          Buffer.TimeOut();

}
```

We claim:

1. An apparatus for communicating a real time media input comprising:
   an encoding device for encoding the media input into a plurality of data packets, each data packet comprising a plurality of frames created according to a first variable;
   a receiving device for unpacking the data packets, and buffering the unpacked data frames packets for a playout of the media input according to a second variable, the receiving device generating a plurality of utility parameters for evaluating a dynamic characteristic of a transporting network that transports the data packets from the encoding device to the receiving device, wherein a preferred utility parameter is selected from the plurality of utility parameters, the preferred utility parameter is used to adjust the first and the second variable so that the encoding device and the receiving device adapt to the dynamic characteristic.

2. The apparatus of claim 1, wherein the first variable is a vector of values that define the compression and packetizing scheme.

3. The apparatus of claim 1, wherein the second variable is a vector of values that define the decompression and depacketizing and playout scheme of the receiving device.

4. The apparatus of claim 1, wherein the real time media input is an audio waveform.

5. The apparatus of claim 1, wherein the real time media input is a video waveform.

6. The apparatus of claim 1, wherein the dynamic transporting characteristic is selected from a group consisting of data packet loss, data packet delay, packet burst loss, loss auto-correlation and delay variation.

7. The apparatus of claim 1, wherein the transporting network comprises a packet switched network.

8. The apparatus of claim 5, wherein the packet switched network is selected from a group consisting of Local Area Networks, Internet Protocol Networks, frame relay networks, ATM networks, and Wide Area Networks.

9. The apparatus of claim 1, wherein the transporting network comprises an interconnected switched network of Local Area Networks, Internet Protocol Networks, and frame relays net works, and Wide Area Networks.

10. The apparatus of claim 5, wherein the packet switched network is an Internet.

11. The apparatus of claim 5, wherein the packet switched network is an Intranet.

12. The apparatus of claim 1, wherein the first variable is an actual redundancy parameter.

13. The apparatus of claim 1, wherein the second variable is an actual buffer length parameter.

14. The apparatus of claim 1, wherein a function of the preferred utility parameter is packeted into a feedback packet which is transported to the encoding device by the transporting network.

15. The apparatus of claim 12, wherein the receiving device packets the function of the preferred utility parameter into the feedback packet.

16. An apparatus for communicating a real time media input, the apparatus comprising:
   a sender comprising an encoder and a packetizer in which the encoder partitions the real time media input into a plurality of frames and compresses the frames, the packetizer packets the compressed frames into a plurality of data packets according to a redundancy value;
   a transporting network that transports the data packets from the sender to a receiver;
   the receiver comprising a real decoder and a plurality of computation decoders, the real decoder comprising a real decoder depacketizer and a real decoder buffer wherein the real decoder depacketizer unpacks the plurality of frames, the frames are placed into the real decoder buffer, a buffer depth is controlled by a buffer length variable,
   each computation decoder having a utility parameter for evaluating a dynamic characteristic of the transporting network, the computation decoder comprising a computation decoder depacketizer and a computation decoder buffer wherein the computation decoder depacketizer unpacks the plurality of frames, and communicates the frames to the computation decoder buffer,
   the receiver selects a preferred utility parameter from the generated utility parameters and communicates a feedback variable to the real decoder buffer, such that the buffer length is adjusted in accordance with a change in the dynamic characteristic.

17. The apparatus of claim 16, wherein the utility parameter is a function of the redundancy variable and the buffer length variable.

18. The apparatus of claim 16, wherein the input is an audio waveform.

19. The apparatus of claim 16, wherein the input is a video waveform.

20. The apparatus of claim 16, wherein a feedback packet is transported by the transporting means to the digital waveform encoder such that the redundancy value is adjusted in accordance with the change in the dynamic characteristic.

21. The apparatus of claim 16, wherein the feedback packet is transported by the transporting means to the packetizer.

22. The apparatus of claim 16, wherein the data packets include a time stamp, a sequence number, a redundancy parameter, a current frame and a plurality of redundant frames.

23. The apparatus of claim 16, wherein the transporting network is a packet switched network.

24. The apparatus of claim 23, wherein the packet switched network is selected from a group consisting of Local Area Networks, Internet Protocol Networks, and frame relay networks, ATM networks, and Wide Area Networks.

25. The apparatus of claim 23, wherein the packet switched network is an Internet.

26. The apparatus of claim 23, wherein the packet switched network is an Intranet.

27. A system for transmitting real time media, the system comprising:
   a first calling device for placing a call to a first processing hub, the first processing hub comprising:
     an encoder for partitioning the call into a plurality of compressed frames, and
     a packetizer for packetizing the frames into a data packet according to a redundancy variable;
   a transporting network for transporting the data packet between the first hub and a second hub wherein the second hub comprises:
     a decoder for decoding the data packet into the plurality of frames and ordering these frames within a buffer having a buffer depth according to a buffer length variable, the decoder generating a plurality of utility parameters based on the redundancy variable and the buffer length variable, wherein the decoder selects a preferred utility parameter from the generated utility parameters such that the redundancy variable and the buffer length variable are adjusted in accordance with a change in the dynamic characteristic; and a second calling device connected to the second processing hub.

28. The apparatus of claim 27, wherein the data packets contain a time stamp, a sequence number, a redundancy parameter, a current frame and a plurality of redundant frames.

29. The apparatus of claim 27, wherein a function of the preferred utility parameter is packeted into a feedback packet and transported to the packetizer by the transporting network.

30. The apparatus of claim 27, wherein the redundancy value is adjusted in accordance with a dynamic characteristic of the transporting network.

31. The apparatus of claim 27 wherein the data packets contain a time stamp, a sequence number, a redundancy parameter, a current frame and a plurality of redundant frames.

32. The apparatus of claim 27 wherein the transporting network is a packet switched network.

33. The apparatus of claim 32 wherein the packet switched network is selected from a group consisting of Local Area Networks, Internet Protocol Networks, frame relay networks, ATM networks, and Wide Area Networks.

34. The apparatus of claim 32 wherein the packet switched network is the Internet.

35. The apparatus of claim 32 wherein the packet switched network is an Intranet.

36. A method for communicating a real time media input comprising the steps of:

communicating the real time media input to a sending device;

encoding the media input into a plurality of frames, packetizing the frames into data packets, each data packet comprising an ordered plurality of the frames according to a first variable;

transporting the data packets to a receiving device;

unpacking the data packets at the receiving device;

buffering the unpacked data packets according to a second variable, generating at least two utility parameters, the utility parameters representing a dynamic characteristic of a transporting network that transports the data packets from the sending device to the receiving device, selecting a preferred utility parameter from the generated utility parameters; and adjusting the first and the second variable according to the selected preferred utility parameter.

37. The method of claim 36 further comprising the step of adjusting the sending device and the receiving device to a change in the dynamic transporting characteristic.

38. The method of claim 36 further comprising the step of playing out the analog input.

39. The method of claim 36 wherein the real time media input is an audio waveform.

40. The method of claim 36 wherein the real time media input is a video waveform.

41. The method of claim 36, further comprising the step of selecting the dynamic characteristic from a group consisting of data packet loss, data packet delay, packet burst loss, loss auto-correlation and delay variation.

42. The method of claim 36, wherein the network comprises a packet switched network.

43. The method of above claim 42, further comprising the step of selecting the packet switched network from a group consisting of Local Area Networks, Internet Protocol Networks, and frame relays.

44. The method of claim 36, wherein the transporting network comprises an interconnected switched network of Local Area Networks, Internet Protocol Networks, frame relay networks, ATM networks, and wide Area Networks.

45. The method of claim 36, further comprising the steps of packetizing a function of the preferred utility parameter into a feedback packet, and transporting the feedback packet to the encoding device by the transporting network.

46. A method for communicating a real time media input comprising the steps of:

partitioning and compressing the real time media input into a plurality of frames at a digital waveform encoder;

packetizing the frames into a plurality of data packets according to an actual redundancy variable;

transporting the data packets by a transporting network from the digital encoder to a receiver;

unpacking the transported data packets into the plurality of frames;

arranging the frames within a buffer according to a buffer length variable;

evaluating a plurality of utility parameters for evaluating a dynamic transporting characteristic of the transporting network;

selecting a preferred utility parameter from the utility parameters; and adapting the buffer length variable according to a change in the transporting characteristic.

47. The method of claim 46, further comprising the step of communicating the unpacked frames to a digital waveform decoder.

48. The method of claim 46, further comprising the step of adopting the actual redundancy variable according to change in the transporting characteristic.

49. The method of claim 46, further comprising the step of playing out the media input.

50. The method of claim 46, wherein the real time media input is an audio waveform.

51. The method of claim 46, wherein the real time media input is a video waveform.

52. The method of claim 46, further comprising the step of selecting the dynamic characteristic from a group consisting of data packet loss, data packet delay, packet burst loss, loss auto-correlation and delay variation.

53. The method of claim 46, wherein the network comprises a packet switched network.

54. The method of above claim 53, further comprising the step of selecting the packet switched network from a group consisting of Local Area Networks, Internet Protocol Networks, and frame relays.

55. The method of claim 46, wherein the transporting network comprises an interconnected switched network of Local Area Networks, Internet Protocol Networks, frame relay networks, ATM networks, and Wide Area Networks.

56. A method for transmitting real time media between a first and a second processing hub comprising the steps of:

placing a call to the first processing hub, partitioning and compressing the call at the first processing hub into a plurality of frames, packetizing the frames at the first processing hub into a data packet according to a redundancy value;

transporting the data packet between the first processing hub and the second processing hub by a transporting network;

decoding the data packet at the second processing hub into the plurality of frames;

ordering these frames within a buffer according to a buffer length variable;

generating a plurality of utility parameters based on the redundancy variable and the buffer length variable;

selecting a preferred utility parameter from the generated utility parameters;

adjusting the redundancy variable and the buffer length variable in accordance with a dynamic transporting characteristic of the transporting network; and receiving the call from the second processing hub.

57. The method of claim 56, further comprising the step of communicating the unpacked frames to a decoder from the second processing hub for a play out of the media input.

58. The method of claim 57, further comprising the step of playing out the media input.

59. The method of claim 56, wherein the real time media input is an audio waveform.

60. The method of claim 56, wherein the real time media input is a video waveform.

61. The method of claim 56, further comprising the step of selecting the dynamic characteristic from a group consisting of data packet loss, data packet delay, packet burst loss, loss auto-correlation and delay variation.

62. The method of claim 56, wherein the network comprises a packet switched network.

63. The method of above claim 62, further comprising the step of selecting the packet switched network from a group consisting of Local Area Networks, Internet Protocol Networks, frame relay networks, ATM networks, and Wide Area Networks.

64. The method of claim 62, wherein the transporting network comprises an interconnected switched network of Local Area Networks, Internet Protocol Networks, frame relay networks, ATM networks, and Wide Area Networks.

* * * * *